US012776874B2

(12) United States Patent
Cheema et al.

(10) Patent No.: US 12,776,874 B2
(45) Date of Patent: Oct. 27, 2026

(54) DM-RS TYPES WITH TIME-DOMAIN RESOURCE ALLOCATION

(71) Applicant: Lenovo (Singapore) Pte. Ltd., New Tech Park (SG)

(72) Inventors: Sher Ali Cheema, Ilmenau (DE); Ankit Bhamri, Rödermark (DE); Seyedomid Taghizadeh Motlagh, Oberursel (DE); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 288 days.

(21) Appl. No.: 18/690,466

(22) PCT Filed: Sep. 8, 2022

(86) PCT No.: PCT/IB2022/058479
§ 371 (c)(1),
(2) Date: Mar. 8, 2024

(87) PCT Pub. No.: WO2023/037292
PCT Pub. Date: Mar. 16, 2023

(65) Prior Publication Data

US 2025/0007662 A1 Jan. 2, 2025

Related U.S. Application Data

(60) Provisional application No. 63/241,918, filed on Sep. 8, 2021.

(51) Int. Cl.
*H04L 5/00* (2006.01)
*H04W 72/0446* (2023.01)

(52) U.S. Cl.
CPC ....... *H04L 5/0048* (2013.01); *H04W 72/0446* (2013.01)

(58) Field of Classification Search
CPC ... H04L 5/0048; H04L 5/0094; H04L 5/0051; H04L 5/005; H04L 5/0023; H04L 5/0044; H04W 72/0446
See application file for complete search history.

(56) References Cited

U.S. PATENT DOCUMENTS

2020/0163060 A1* 5/2020 Yoshimura ............ H04W 72/23
2021/0321442 A1* 10/2021 Jung .................... H04B 7/0617
2024/0163149 A1 5/2024 Ali et al.

FOREIGN PATENT DOCUMENTS

WO WO-2020146638 A1 * 7/2020 ........... H04L 27/261
WO 2021108653 A1 6/2021

OTHER PUBLICATIONS

PCT/IB2022/058479, "Notification of Transmittal of the International Search Report and the Written Opinion of the International Searching Authority, or the Declaration", International Searching Authority, Nov. 29, 2022, pp. 1-11.

(Continued)

*Primary Examiner* — Sulaiman Nooristany
(74) *Attorney, Agent, or Firm* — Kunzler Needham Hilton

(57) ABSTRACT

Apparatuses, methods, and systems are disclosed for DM-RS types with time-domain resource allocation. An apparatus (1200) includes a transceiver (1225) and a processor (1205) that is configured to cause the apparatus (1200) to receive a demodulation reference signal ("DM-RS") configuration from a network, receive a DM-RS sequence within the block duration of the single carrier waveform according to the received DM-RS configuration, receive a data sequence that is quasi-collocated with an associated DM-RS resource, and demodulate the received data sequence using the DM-RS sequence.

20 Claims, 13 Drawing Sheets

(56) References Cited

OTHER PUBLICATIONS

3GPP, "3rd Generation Partnership Project; Technical Specification Group Radio Access Network; NR; Physical channels and modulation (Release 16)", 3GPP TS 38.211 V16.6.0, Jun. 2021, pp. 1-134.

3GPP, "3rd Generation Partnership Project; Technical Specification Group Radio Access Network; NR; Multiplexing and channel coding (Release 16)", 3GPP TS 38.212 V16.6.0, Jun. 2021, pp. 1-153.

3GPP, "3rd Generation Partnership Project; Technical Specification Group Radio Access Network; NR; Physical layer procedures for data (Release 16)", 3GPP TS 38.214 V16.6.0, Jun. 2021, pp. 1-172.

* cited by examiner

*DMRS-DownlinkConfig* information element

```
-- ASN1START
-- TAG-DMRS-DOWNLINKCONFIG-START

DMRS-DownlinkConfig ::=          SEQUENCE {
   dmrs-Type                    ENUMERATED {type3}
OPTIONAL,   -- Need S
   dmrs-AdditionalPosition          ENUMERATED {pos0, pos1, pos3}
OPTIONAL,   -- Need S
   maxLength                    ENUMERATED {len2}
OPTIONAL,   -- Need S
   scramblingID0                 INTEGER (0..65535)
OPTIONAL,   -- Need S
   scramblingID1                 INTEGER (0..65535)
OPTIONAL,   -- Need S
   phaseTrackingRS                SetupRelease { PTRS-DownlinkConfig  }
OPTIONAL,   -- Need M
   ...,
   [[
   dmrs-Downlink-r16             ENUMERATED {enabled}
OPTIONAL    -- Need R
   ]]

}

-- TAG-DMRS-DOWNLINKCONFIG-STOP
-- ASN1STOP
```

FIG. 7

DM-RS TYPES WITH TIME-DOMAIN RESOURCE ALLOCATION

CROSS REFERENCE TO RELATED APPLICATIONS

This application claims the benefit of U.S. Provisional Patent Application No. 63/241,918, entitled "DM-RS TYPES WITH TIME-DOMAIN RESOURCE ALLOCATION" and filed on Sep. 8, 2021, for Sher Ali Cheema, et al., which is incorporated herein by reference.

FIELD

The subject matter disclosed herein relates generally to wireless communications and more particularly relates to DM-RS types with time-domain resource allocation.

BACKGROUND

In wireless networks, demodulation reference signals ("DM-RSs") may be used to estimate a radio channel for a user equipment ("UE") device.

BRIEF SUMMARY

Disclosed are solutions for DM-RS types with time-domain resource allocation. The solutions may be implemented by apparatus, systems, methods, or computer program products.

In one embodiment, a first apparatus includes a transceiver and a processor coupled to the transceiver. In one embodiment, the processor is configured to cause the first apparatus to receive a DM-RS configuration from a network, the DM-RS configuration comprising a time domain occasion of a DM-RS sequence within a block duration of a single carrier waveform, a time domain pattern of the DM-RS sequence, and a sequence length of the DM-RS sequence. In one embodiment, the processor is configured to cause the first apparatus to receive a DM-RS sequence within the block duration of the single carrier waveform according to the received DM-RS configuration, receive a data sequence that is quasi-collocated with an associated DM-RS resource, and demodulate the received data sequence using the DM-RS sequence.

In one embodiment, a first method receives a DM-RS configuration from a network, the DM-RS configuration comprising a time domain occasion of a DM-RS sequence within a block duration of a single carrier waveform, a time domain pattern of the DM-RS sequence, and a sequence length of the DM-RS sequence. In one embodiment, the first method receives a DM-RS sequence within the block duration of the single carrier waveform according to the received DM-RS configuration, receives a data sequence that is quasi-collocated with an associated DM-RS resource, and demodulates the received data sequence using the DM-RS sequence.

In one embodiment, a second apparatus includes a transceiver and a processor coupled to the transceiver. In one embodiment, the processor is configured to cause the second apparatus to transmit a DM-RS configuration to a UE, the DM-RS configuration comprising a time domain occasion of a DM-RS sequence within a block duration of a single carrier waveform, a time domain pattern of the DM-RS sequence, and a sequence length of the DM-RS sequence. In one embodiment, the processor is configured to cause the second apparatus to determine a DM-RS sequence for demodulating a data sequence that is quasi-collocated with an associated DM-RS resource, transmit the DM-RS sequence within the block duration of the single carrier waveform according to the received DM-RS configuration, and transmit the data sequence that is quasi-collocated with an associated DM-RS resource.

In one embodiment, a second method transmits a DM-RS configuration to a UE, the DM-RS configuration comprising a time domain occasion of a DM-RS sequence within a block duration of a single carrier waveform, a time domain pattern of the DM-RS sequence, and a sequence length of the DM-RS sequence. In one embodiment, the second method determines a DM-RS sequence for demodulating a data sequence that is quasi-collocated with an associated DM-RS resource, transmit the DM-RS sequence within the block duration of the single carrier waveform according to the received DM-RS configuration, and transmit the data sequence that is quasi-collocated with an associated DM-RS resource.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 depicts a diagram of a DMRS-DownlinkConfig information element;

DETAILED DESCRIPTION

Figure 1:
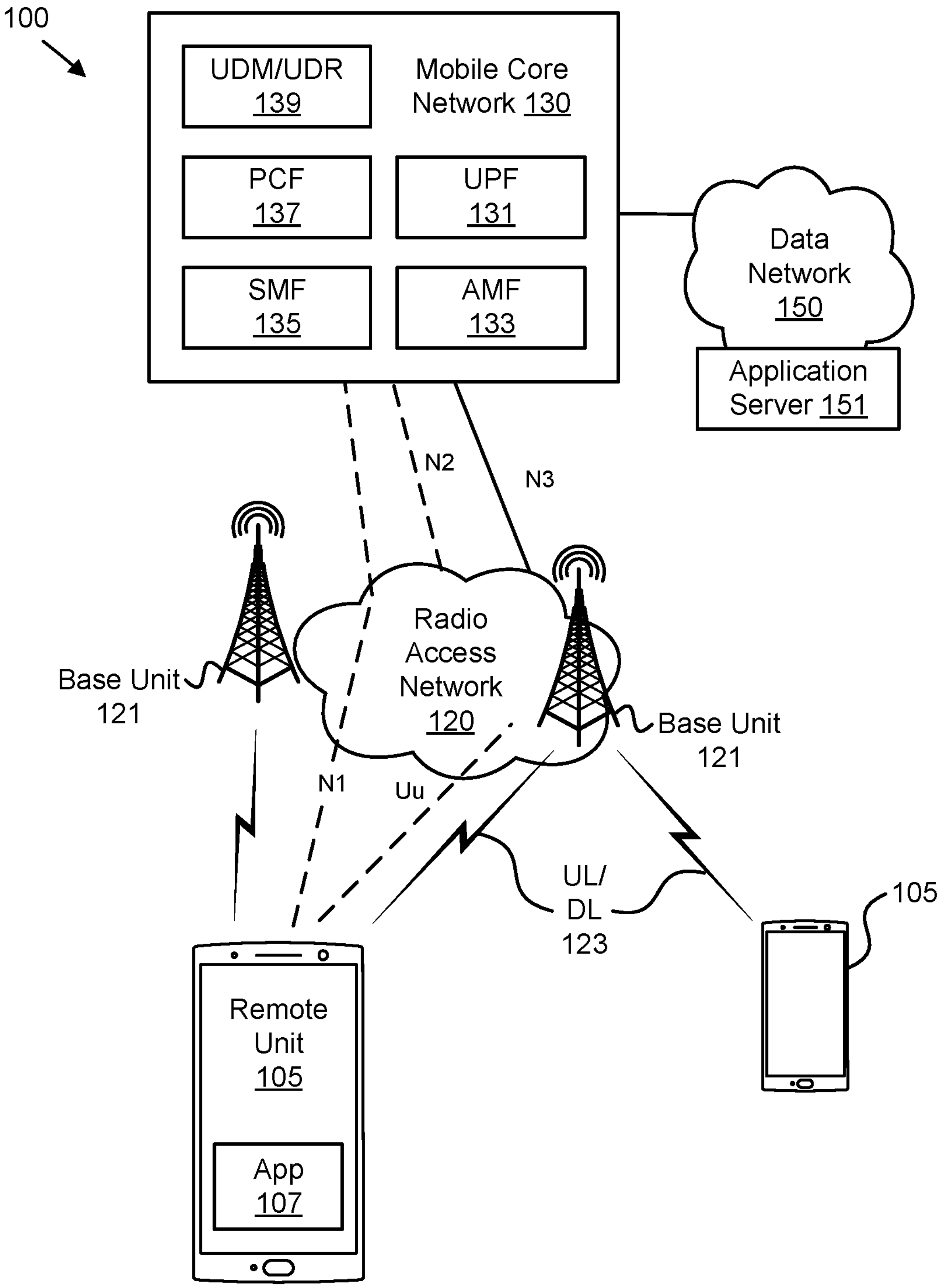
FIG. 1 is a schematic block diagram illustrating one embodiment of a wireless communication system for DM-RS types with time-domain resource allocation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having," and variations thereof mean "including but not limited to," unless expressly specified otherwise. An enumerated listing of items does not imply that any or all the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for DM-RS types with time-domain resource allocation. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In Rel-18 or beyond, it is expected that new waveforms will be considered for NR operation beyond 71 GHz and even for FR2. In current NR releases, only Cyclic Prefix-Orthogonal Frequency Division Multiplexing ("CP-OFDM") is supported for downlink ("DL") while CP-OFDM and discrete Fourier transform spread orthogonal frequency division multiplexing ("DFT-s-OFDM") are supported for uplink ("UL"). CP-OFDM performance degrades at high frequencies (e.g., beyond 71 GHz) due to its sensitivity to phase noise and its high peak-to-average power ratio ("PAPR") or cubic metric ("CM") that limits the cell coverage, edge of cell performance and higher UE power consumption. Any new waveform such a DFT-s-OFDM, SC-FDE, SC-quadrature amplitude modulation ("QAM") or some other single carrier waveform is expected to be specified for 5G-Advanced in addition to CP-OFDM. If single carrier waveform such as SC-FDE is adopted for UL/DL, many reference signals shall be redesigned as these reference signals will be employed in the time domain. Especially for SC-FDE, the use of guard interval at the transmitter may be additionally utilized for assisting channel estimation, carrier phase and frequency offsets, symbol timings, and optimal fast Fourier transform FFT window timing. In this disclosure, DM-RS configurations are disclosed that may be utilized for SC-FDE in both UL and DL.

In the following descriptions, the terms antenna, panel, antenna panel, device panel and UE panel are used interchangeably. An antenna panel may be a hardware that is used for transmitting and/or receiving radio signals at frequencies lower than 6 GHz, e.g., frequency range 1 ("FR1", i.e., frequencies from 410 MHz to 7125 MHZ), or higher than 6 GHz, e.g., frequency range 2 ("FR2", i.e., frequencies from 24.25 GHz to 52.6 GHz) or millimeter wave (mmWave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device antenna panel (e.g., of a UE or RAN node) may be a physical or logical antenna array comprising a set of antenna elements or antenna ports that share a common or a significant portion of an RF chain (e.g., in-phase/quadrature ("I/Q") modulator, analog-to-digital ("A/D") converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to gNB. For certain condition(s), gNB or network can assume the mapping between device's physical antennas to the logical entity "device panel" may not be changed. For example, the condition may include until the next update or report from device or comprise a duration of time over which the gNB assumes there will be no change to the mapping.

A device may report its capability with respect to the "device panel" to the gNB or network. The device capability may include at least the number of "device panels." In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. For example, qcl-Type may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}.

Spatial Rx parameters may include one or more of: angle of arrival (AoA,) Dominant AoA, average AoA, angular spread, Power Angular Spectrum (PAS) of AoA, average AoD (angle of departure), PAS of AoD, transmit/receive channel correlation, transmit/receive beamforming, spatial channel correlation, etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

FIG. 1 depicts a wireless communication system 100 supporting DM-RS types with time-domain resource allocation, according to embodiments of the disclosure. In one embodiment, the wireless communication system 100 includes at least one remote unit 105, a radio access network ("RAN") 120, and a mobile core network 130. The RAN 120 and the mobile core network 130 form a mobile communication network. The RAN 120 may be composed of a base unit 121 with which the remote unit 105 communicates using wireless communication links 115. Even though a specific number of remote units 105, base units 121, wireless communication links 115, RANs 120, and mobile core networks 130 are depicted in FIG. 1, one of skill in the art will recognize that any number of remote units 105, base units 121, wireless communication links 115, RANs 120, and mobile core networks 130 may be included in the wireless communication system 100.

In one implementation, the RAN 120 is compliant with the 5G system specified in the Third Generation Partnership Project ("3GPP") specifications. For example, the RAN 120 may be a New Generation Radio Access Network ("NG-RAN"), implementing NR RAT and/or 3GPP Long-Term Evolution ("LTE") RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130.

In some embodiments, the remote units 105 communicate with an application server via a network connection with the mobile core network 130. For example, an application 107 (e.g., web browser, media client, telephone and/or Voice-over-Internet-Protocol ("VOIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server (e.g., the content server 151 in the packet data network 150) using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 150, e.g., representative of the Internet. The remote unit 105 may establish additional PDU sessions for communicating with other data networks and/or other communication peers.

In the context of a 5G system ("5GS"), the term "PDU Session" a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a 5GC or an Evolved Packet Core ("EPC"), which may be coupled to a packet data network 150, like the Internet and private data networks, among other data networks. A remote unit 105 may have a subscription or other account with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Network Exposure Function ("NEF") 136, a Policy Control Function ("PCF") 137, a Unified Data Management function ("UDM") and a User Data Repository ("UDR").

The UPF(s) 131 is responsible for packet routing and forwarding, packet inspection, QoS handling, and external PDU session for interconnecting Data Network ("DN"), in the 5G architecture. The AMF 133 is responsible for termination of NAS signaling, NAS ciphering & integrity protection, registration management, connection management, mobility management, access authentication and authorization, security context management. The SMF 135 is responsible for session management (i.e., session establishment, modification, release), remote unit (i.e., UE) IP address allocation & management, DL data notification, and traffic steering configuration for UPF for proper traffic routing.

The NEF is responsible for making network data and resources easily accessible to customers and network partners. Service providers may activate new capabilities and expose them through APIs. These APIs allow third-party authorized applications to monitor and configure the network's behavior for a number of different subscribers (i.e., connected devices with different applications). The PCF 137 is responsible for unified policy framework, providing policy rules to CP functions, access subscription information for policy decisions in UDR.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 139.

In various embodiments, the mobile core network 130 may also include an Authentication Server Function ("AUSF") (which acts as an authentication server), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. A network instance may be identified by a single-network slice selection assistance information ("S-NSSAI,") while a set of network slices for which the remote unit 105 is authorized to use is identified by network slice selection assistance information ("NSSAI").

Here, "NSSAI" refers to a vector value including one or more S-NSSAI values. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed. Where different network slices are deployed, the mobile core network 130 may include a Network Slice Selection Function ("NSSF") which is responsible for selecting of the Network Slice instances to serve the remote unit 105, determining the allowed NSSAI, determining the AMF set to be used to serve the remote unit 105.

Although specific numbers and types of network functions are depicted in FIG. 1, one of skill in the art will recognize that any number and type of network functions may be included in the mobile core network 130. Moreover, in an LTE variant where the mobile core network 130 comprises an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

While FIG. 1 depicts components of a 5G RAN and a 5G core network, the described embodiments apply to other types of communication networks and RATs, including IEEE 802.11 variants, Global System for Mobile Communications ("GSM", i.e., a 2G digital cellular network), General Packet Radio Service ("GPRS"), UMTS, LTE variants, CDMA 2000, Bluetooth, ZigBee, Sigfox, and the like.

In the following descriptions, the term "gNB" is used for the base station but it is replaceable by any other radio access node, e.g., RAN node, eNB, Base Station ("BS"), Access Point ("AP"), NR, etc. Further the operations are described mainly in the context of 5G NR. However, the proposed solutions/methods are also equally applicable to other mobile communication systems supporting CSI enhancements for higher frequencies.

Regarding DM-RS in NR, a front-loaded DM-RS structure is used as a baseline to achieve low-latency decoding. In the time-frequency resource grid, the front-loaded DM-RS can be located just after the control region, followed by data region. As soon as a channel is estimated based on the front-loaded DM-RS, the receiver can coherently demodulate data in the data region. The front-loaded DM-RS structure is particularly advantageous in decoding-latency reduction for low-mobility scenarios where channel coherence time is longer than the duration of the front-loaded DM-RS. However, allocating only the front-loaded DM-RS can degrade the link performance at higher UE speeds (i.e., channel coherence time becomes shorter). Although the channel information in the data region can be obtained by interpolation, the channel information accuracy diminishes with higher mobility. Therefore, we consider the front-loaded DM-RS patterns with different time-domain densities. To support high-speed scenarios, it is possible to configure up to three additional DM-RS occasions in a slot. The channel estimation in the receiver side can use these additional reference signals for more accurate channel estimation, for example, to perform interpolation between the DM-RS occasions within a slot.

For high-speed scenarios, the time density of DM-RS is increased to track fast changes in the radio channel. The NR defines two time-domain DM-RS structures which differ in the location of the first DM-RS symbol:

- Mapping Type A, where the first DM-RS is in the second and the third symbol of the slot and the DM-RS is mapped relative to the start of the slot boundary, regardless of where in the slot the actual data transmission occurs. This mapping type is primarily intended for the case where the data occupy (most of) a slot. The reason for the use of the second or the third symbol in the downlink slot is to locate the first DM-RS occasion after a control resource set ("CORESET") that is positioned at the beginning of a slot.
- Mapping Type B, where the first DM-RS is positioned in the first symbol of the data allocation, that is, the DM-RS location is not given relative to the slot boundary, rather relative to where the data are located. This mapping is intended for transmissions over a small fraction of the slot to support very low latency and other transmissions that cannot wait until a slot boundary starts regardless of the transmission duration. The mapping type for physical downlink shared channel ("PDSCH") transmission can be dynamically signaled as part of the downlink control information ("DCI"), while for the physical uplink shared channel ("PUSCH") the mapping type is semi-statically configured.

Figure 2:
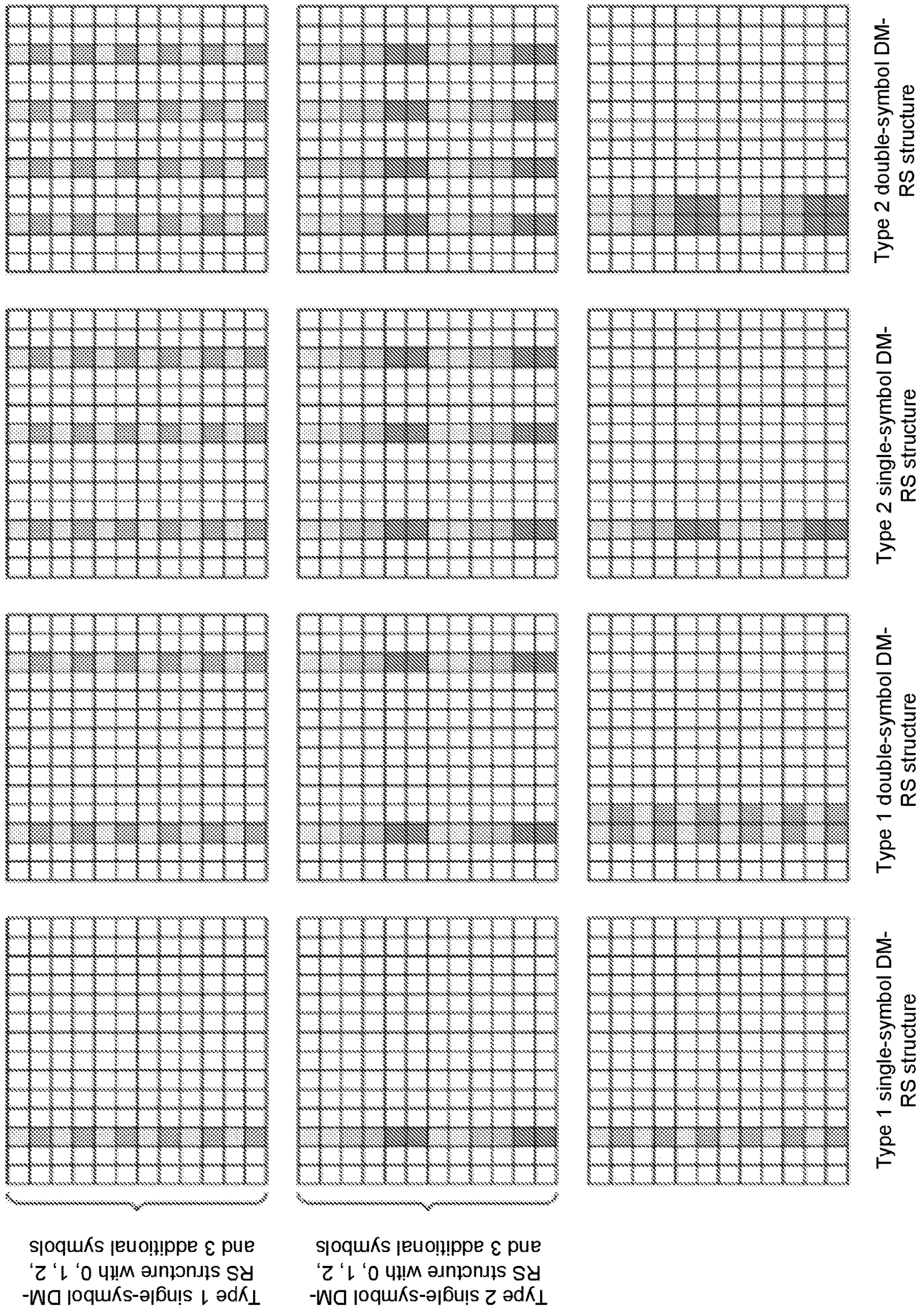
FIG. 2 depicts a diagram of DM-RS configuration types and patterns in new radio ("NR")

As shown in FIG. 2, the different time-domain locations for PDSCH, DM-RS mapping types are single-symbol and double-symbol DM-RS patterns. The purpose of the double-symbol DM-RS is primarily to provide a larger number of antenna ports than what is possible with a single-symbol structure as discussed later. Note that the time-domain location of the DM-RS depends on the scheduled data duration. Multiple orthogonal reference signals can be generated in each DM-RS occasion. Different DM-RS patterns can be configured which are separated in time, frequency, and code domains. The DM-RS has two types: that is, Types 1 and 2, which are distinguished in frequency-domain mapping and the maximum number of orthogonal reference signals. Type 1 can provide up to four orthogonal signals using a single-symbol DM-RS and up to eight orthogonal reference signals using a double-symbol DM-RS, whereas Type 2 can provide 6 and 12 patterns depending on the number of symbols. The DM-RS Type 1 or 2 should not be confused with the mapping Type A or B since different mapping types can be combined with different reference signal types. Reference signals should have small power variations in the frequency domain to allow a similar channel-estimation quality for all frequencies spanned by the reference signal.

Regarding DM-RS for PDSCH (e.g., as described in 7.4.1.1.1 of TS 38.211, which is incorporated herein by reference) Sequence Generation, the UE shall assume the sequence r(n) is defined by $$r(n) = \frac{1}{\sqrt{2}}(1 - 2\cdot c(2n)) + j\frac{1}{\sqrt{2}}(1 - 2\cdot c(2n+1))$$

where the pseudo-random sequence c(i) is defined in clause 5.2.1 of TS 38.211. The pseudo-random sequence generator shall be initialized with $$c_{init} = \left(2^{17}\left(N_{symb}^{slot} n_{s,f}^{\mu} + 1 + 1\right)\left(2N_{ID}^{\bar{n}_{SCID}^{\lambda}} + 1\right) + 2^{17}\left\lfloor\frac{\lambda}{2}\right\rfloor + 2N_{ID}^{\bar{n}_{SCID}^{\lambda}} + \bar{n}_{SCID}^{\lambda}\right) \bmod 2^{31}$$

where l is the OFDM symbol number within the slot, $$n_{s,f}^{\mu}$$

is the slot number within a frame, and:

$$N_{ID}^{0}, N_{ID}^{1} \in \{0, 1, \ldots, 65535\}$$

are given by the higher-layer parameters scramblingID0 and scramblingID1, respectively, in the DMRS-DownlinkConfig information element ("IE") if provided and the PDSCH is scheduled by physical downlink control channel ("PDCCH") using DCI format 1_1 or 1_2 with the cyclic redundancy check ("CRC") scrambled by cell radio network temporary identifier ("C-RNTI"), modulation coding scheme ("MCS")-C-RNTI, or configured scheduling ("CS")-RNTI $$N_{ID}^{0} \in \{0, 1, \ldots, 65535\}$$

is given by the higher-layer parameter scramblingID0 in the DMRS-DownlinkConfig IE if provided and the PDSCH is scheduled by PDCCH using DCI format 1_0 with the CRC scrambled by C-RNTI, MCS-C-RNTI, or CS-RNTI;

$$N_{ID}^{n_{SCID}} = N_{ID}^{cell}$$

otherwise;

$$\bar{n}_{SCID}^{\lambda}$$

is given by $$\bar{n}_{SCID}^{\lambda} = \begin{cases} n_{SCID} & \lambda = 0 \text{ or } \lambda = 2 \\ 1 - n_{SCID} & \lambda = 1 \end{cases}$$

if the higher-layer parameter DMRSdownlink-r16 in the DMRS-DownlinkConfig IE is provided, otherwise by $$\bar{n}_{SCID}^{\lambda} = n_{SCID}$$

λ is the CDM group defined in clause 7.4.1.1.2 of TS 38.211.

The quantity $n_{SCID} \in \{0, 1\}$ is given by the DM-RS sequence initialization field, if present, in the DCI associated with the PDSCH transmission if DCI format 1_1 or 1_2, (e.g., described in TS 38.212, which is incorporated herein by reference) is used, otherwise $n_{SCID}=0$.

According to section 7.4.1.1.2 of TS 38.211 directed to mapping to physical resources, the UE shall assume the PDSCH DM-RS being mapped to physical resources according to configuration type 1 or configuration type 2 as given by the higher-layer parameter dmrs-Type.

The UE shall assume the sequence r(m) is scaled by a factor $$\beta_{PDSCH}^{DMRS}$$

to conform with the transmission power (e.g., as specified in TS 38.214, which is incorporated herein by reference) and mapped to resource elements $(k, l)_{p,\mu}$ according to $$a_{k,l}^{(p,\mu)} = \beta_{PDSCH}^{DMRS} w_f(k') w_t(l') r(2n + k')$$

-continued $$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

where $w_f(k')$, $w_t(l')$, and Δ are given by Tables 7.4.1.1.2-1 (reproduced below) and 7.4.1.1.2-2 of TS 38.211 and the following conditions are fulfilled:

the resource elements are within the common resource blocks allocated for PDSCH transmission The reference point for k is subcarrier 0 of the lowest-numbered resource block in CORESET 0 if the corresponding PDCCH is associated with CORESET 0 and Type0-PDCCH common search space and is addressed to SI-RNTI;

otherwise, subcarrier 0 in common resource block 0

The reference point for/and the position 4 of the first DM-RS symbol depends on the mapping type:

for PDSCH mapping type A:

l is defined relative to the start of the slot.

$l_0$=3 if the higher-layer parameter dmrs-TypeA-Position is equal to 'pos3' and $l_0$=2 otherwise for PDSCH mapping type B:

l is defined relative to the start of the scheduled PDSCH resources.

$l_0$=0

The position(s) of the DM-RS symbols is given by 7 and duration $l_d$ where for PDSCH mapping type A, $l_d$ is the duration between the first OFDM symbol of the slot and the last OFDM symbol of the scheduled PDSCH resources in the slot for PDSCH mapping type B, $l_d$ is the duration of the scheduled PDSCH resources and according to Tables 7.4.1.1.2-3 and 7.4.1.1.2-4 of TS 38.211.

For PDSCH mapping type A the case dmrs-AdditionalPosition equals to 'pos3' is only supported when dmrs-TypeA-Position is equal to 'pos2':

$l_d$=3 and $l_d$=4 symbols in Tables 7.4.1.1.2-3 and 7.4.1.1.2-4 of TS 38.211, respectively, is only applicable when dmrs-TypeA-Position is equal to 'pos2':

single-symbol DM-RS, $l_1$=11 except if all of the following conditions are fulfilled in which case $l_1$=12:

the higher-layer parameter lte-CRS-ToMatchAround or additionalLTE-CRS-ToMatchAroundList is configured; and the higher-layer parameter dmrs-AdditionalPosition is equal to 'pos1' and $l_0$=3; and the UE has indicated it is capable of additionalDMRS-DL-Alt For PDSCH mapping type B if the PDSCH duration $l_d \in \{2,3,4,5,6,7,8,9,10,11,12,13\}$ OFDM symbols for normal cyclic prefix or $l_d \in \{2,4,6\}$ OFDM symbols for extended cyclic prefix, and the front-loaded DM-RS of the PDSCH allocation collides with resources reserved for a search space set associated with a CORESET, I shall be incremented such that the first DM-RS symbol occurs immediately after the CORESET and until no collision with any CORESET occurs, and.

if the PDSCH duration $l_d$ is 2 symbols, the UE is not expected to receive a DM-RS symbol beyond the second symbol, if the PDSCH duration $l_d$ is 7 symbols for normal cyclic prefix or 6 symbols for extended cyclic prefix:

the UE is not expected to receive the front-loaded DM-RS beyond the fourth symbol, and.

if one additional single-symbol DM-RS is configured, the UE only expects the additional DM-RS to be transmitted on the 5th or 6th symbol when the front-loaded DM-RS symbol is in the 1st or 2nd symbol, respectively, of the PDSCH duration, otherwise the UE should expect that the additional DM-RS is not transmitted:

if the PDSCH duration $l_d$ is 12 or 13 symbols, the UE is not expected to receive a DM-RS symbol mapped to symbol 12 or later in the slot;

for all other values of the PDSCH duration $l_d$, the UE is not expected to receive a DM-RS symbol beyond the $(l_d-1)$: th symbol:

if the PDSCH duration $l_d$ is 2 or 4 OFDM symbols, only single-symbol DM-RS is supported.

if the higher-layer parameter lte-CRS-ToMatchAround or additionalLTE-CRS-ToMatchAroundList is configured, the PDSCH duration $l_d$=10 symbols for normal cyclic prefix, the subcarrier spacing configuration μ=0, single-symbol DM-RS is configured, and at least one PDSCH DM-RS symbol in the PDSCH allocation collides with a symbol containing resource elements as indicated by the higher-layer parameter lte-CRS-ToMatchAround or additionalLTE-CRS-ToMatchAroundList, then $\bar{l}$ shall be incremented by one in all slots.

The time-domain index l' and the supported antenna ports p are given by Table 1, where single-symbol DM-RS is used if the higher-layer parameter maxLength in the DMRS-DownlinkConfig IE is not configured.

single-symbol or double-symbol DM-RS is determined by the associated DCI if the higher-layer parameter maxLength in the DMRS-DownlinkConfig IE is equal to 'len2'.

In absence of CSI-RS configuration, and unless otherwise configured, the UE may assume PDSCH DM-RS and SS/PBCH block to be quasi co-located with respect to Doppler shift, Doppler spread, average delay, delay spread, and, when applicable, spatial Rx parameters. The UE may assume that the PDSCH DM-RS within the same CDM group is quasi co-located with respect to Doppler shift, Doppler spread, average delay, delay spread, and spatial Rx. The UE may assume that DMRS ports associated with a PDSCH are QCL with QCL Type A, Type D (when applicable) and average gain.

The UE may assume that no DM-RS collides with the SS/PBCH block.

TABLE 7.4.1.1.2-1

Parameters for PDSCH DM-RS configuration type 1.

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |

TABLE 7.4.1.1.2-1-continued

Parameters for PDSCH DM-RS configuration type 1.

| p | CDM group λ | Δ | $w_f(k')$ k' = 0 | $w_f(k')$ k' = 1 | $w_t(l')$ l' = 0 | $w_t(l')$ l' = 1 |
|---|---|---|---|---|---|---|
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

Figure 3:
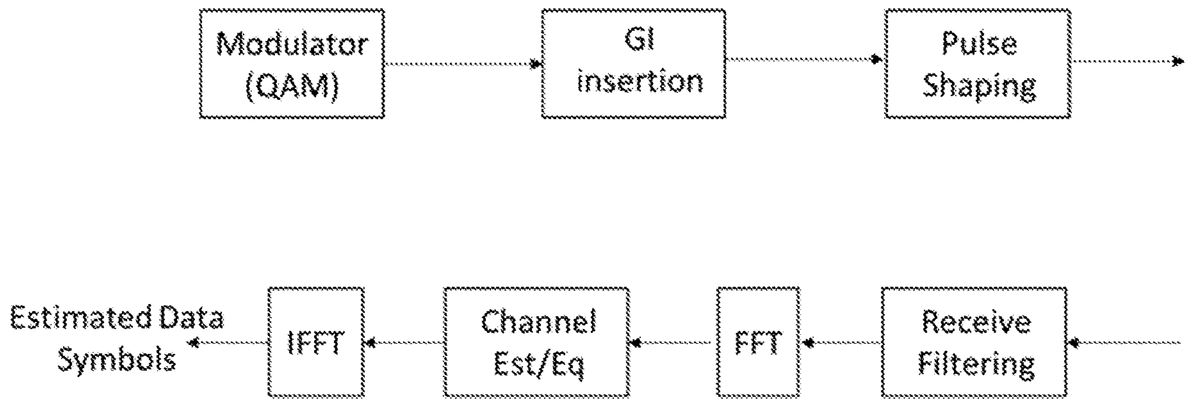
FIG. 3 depicts a diagram of an single carrier frequency domain equalization ("SC-FDE") receiver.

In this disclosure, signaling techniques are disclosed to employ DM-RS for single carrier waveform, specifically for SC-FDE. Some of these methods may be used for multi-carrier waveforms. A single carrier waveform, if employed without a guard interval over a block of data, will require the receiver to use time domain channel estimation and equalization which has a high computational complexity. To use methods with lower computational complexity, e.g., frequency domain equalization/channel estimation methods, at the receiver, a guard interval needs to be periodically inserted over a block of data to fulfill the cyclic convolutional property, as shown in FIG. 3. The guard interval is random (vary by each block of data), redundant (used just to fulfil cyclic convolutional property) and is unknown to the receiver. Alternatively, a known guard interval can also be inserted over a block of data that can additionally be utilized for channel estimation and/or synchronization.

Figure 4:
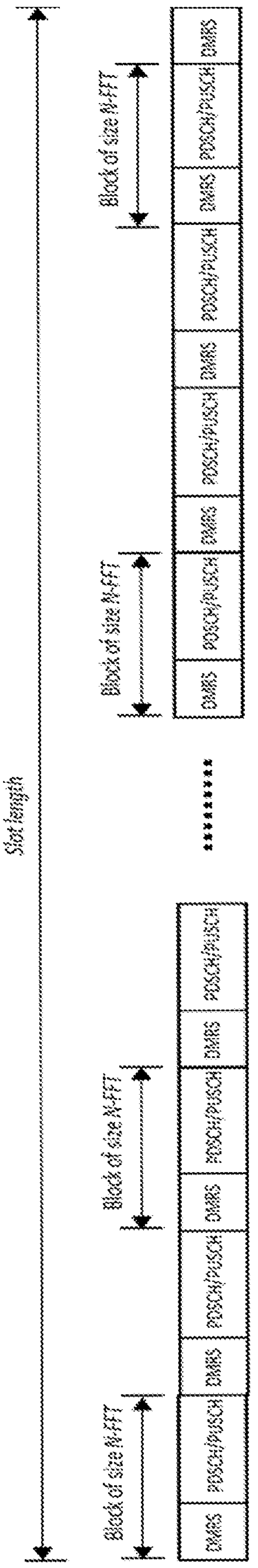
FIG. 4 depicts a diagram of DM-RS configuration Type 3.

According to a first embodiment, a new DM-RS type, for example namely as configuration type 3, is disclosed, where DM-RS are inserted periodically in the time domain inside a block of FFT length data or data samples. As shown in FIG. 4, these are either placed at the start or at the bottom of data/data samples and are utilized for various purposes, e.g., as a cyclic prefix for cyclic convolution and as a pilot symbols for assisting in channel acquisition. An additional guard length DM-RS block is added over a continuous length of FFT blocks transmission (e.g., over a slot) to fulfil the cyclic property.

In one implementation, the DM-RS configuration type 3 is associated with SC-FDE waveform. In another implementation, the DM-RS configuration type 3 may be associated with single carrier and/or multi-carrier waveforms such as unique word OFDM ("UW-OFDM"). The length of the DM-RS can be taken according to normal or extended CP durations for different FFT sizes in the specification. In one implementation, new durations corresponding to the FFT lengths may be associated and defined in the specification, for DM-RS configuration type 3.

Figure 5:
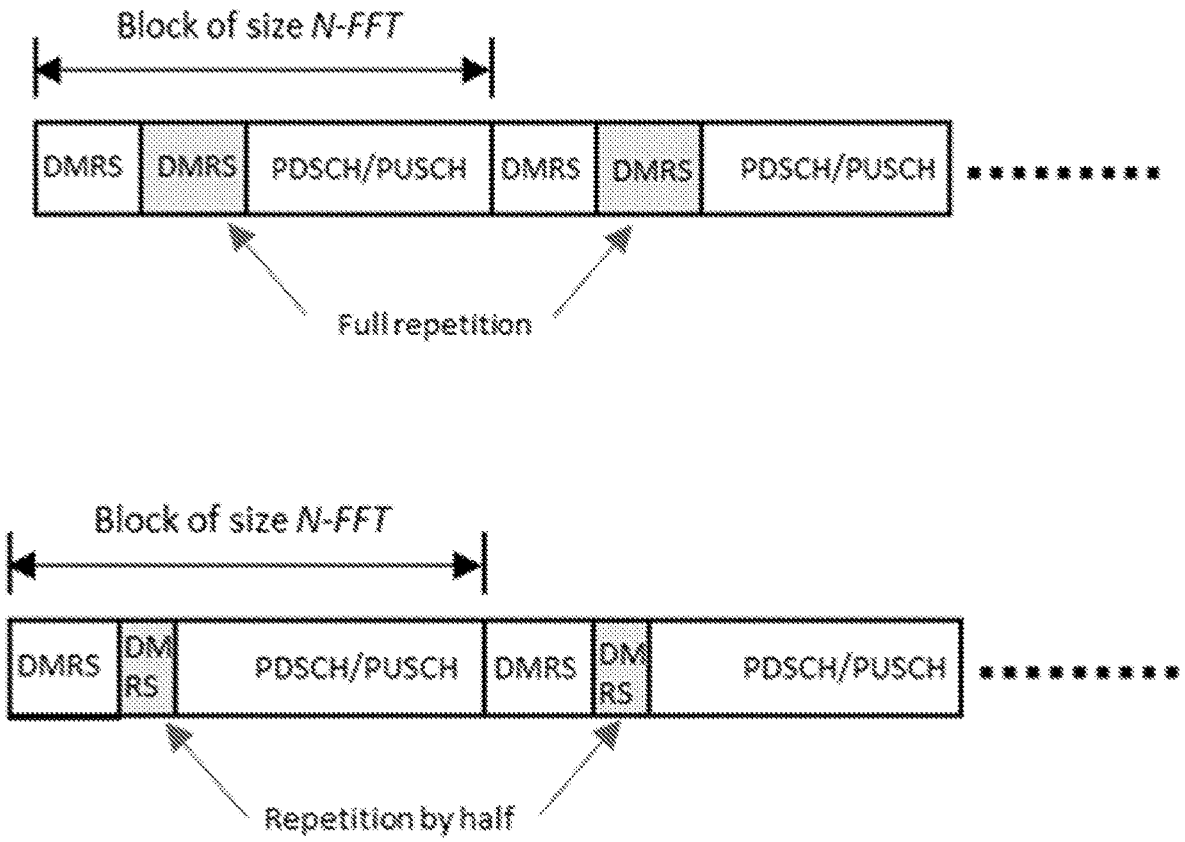
FIG. 5 depicts a diagram of variable size DM-RS configuration Type 3.

In cases, where channel delay spreads span nearly the guard interval length, the payload data (e.g., PDSCH or PUSCH) will have a lot of interference to the DM-RS block, which will eventually result in bad channel estimation. Therefore, in one implementation, an additional number of DM-RS blocks may be cyclically extended within a N-FFT block, as shown in FIG. 5. In one option, the length of additional DM-RS blocks may be the same as the first DM-RS block. In another option, the length may be variable and may be increased by a factor of an original DM-RS block.

In some embodiments, to alleviate the interference from the payload data in the channels with a high delay spread, the existing DM-RS can be pulse shaped to concentrate the energy in the regions away from the interfering payload data. In some embodiments, the transmit power of DM-RS is adjusted to satisfy an intended quality within the assigned DM-RS duration.

In some implementations, UE may trigger a modification in the DM-RS parameters, including the DM-RS duration, DM-RS type, and/or power or some combination thereof.

The length of additional DM-RS may be indicated explicitly or implicitly. In one implementation, based on the channel quality, e.g., L1-RSRP, RSRQ value, the network may indicate the repetition factor dynamically through DCI. For example, the length of repetition may be calculated by $m+1/2^n$, where m=0, 1, 2, . . . indicates the full DM-RS block repetition factor and n–0, 1, 2, . . . indicates the DM-RS block partial length factor. For example, if m=0 and n=1, the half of the DM-RS block is repeated. In this way, a partial, full, or combination of both DM-RS length additions may be carried out by indicating m and n variables in DCI. In order to reduce the overhead, the repetition factor may be upper bounded by m=n=2, that provides sufficient margin for channel estimation for scenarios with larger channel delay spreads. In one implementation, a table indicating the length of additional DM-RS may be specified in the specification and only an index corresponding to increase in length of additional DM-RS may be indicated through DCI.

In another implementation, the additional DM-RS blocks are only inserted at specified block numbers. In one option, mapping type A and B may be used to define the location of additional DM-RS blocks, where, for configuration type 3, the symbol number will refer to the block number. For example, if mapping type A and configuration type 3 are configured, the additional DM-RS blocks are in the second and the third block number of the slot and if mapping type B is configured, the additional DM-RS blocks re positioned in the first symbol of the data allocation. In another implementation, a new mapping type, e.g., mapping type C, may be defined for configuration type 3, where additional DM-RS blocks would be inserted at specified block numbers in a slot.

Figure 6:
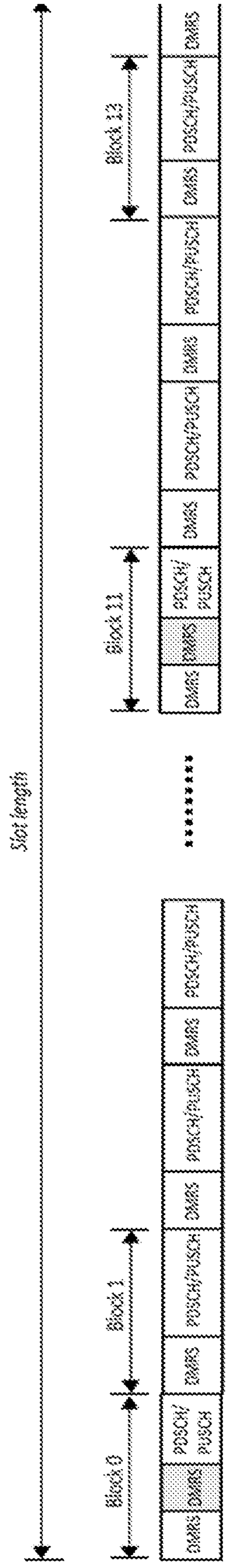
FIG. 6 depicts a diagram of fixed position DM-RS configuration Type 3.

In another implementation, the additional DM-RS lengths and their location is fixed for different N-FFT block sizes, as shown in FIG. 6. For example, as shown in FIG. 6, the first block (block 0) uses two DM-RS block lengths, and it would result in better channel estimates while DM-RS in block I onwards are used for channel tracking. Depending upon the deployment scenarios and frequency ranges, various mapping type may be pre-defined in the specification. For example, for high-speed scenarios, where the channel variations are large, a mapping type that incorporates more additional DM-RS blocks may be defined while other scenarios with frequency flat channel impulse response, a mapping type with reduce number of additional DM-RS blocks may be used. In such cases, only mapping type is dynamically signaled as part of DCI or semi-statically configured.

In some embodiments, a default configuration of DM-RS configuration Type 3 might include DMRS block inserted only at the beginning of first block (block 0) within a transmission time interval ("TTI"). In one implementation, the number of additional DM-RS blocks and the position of the additional DM-RS blocks are semi-statically and/or dynamically configured by the network. In an alternate implementation, UE can initiate a change in the configuration in terms of number of DM-RS blocks to be inserted, length of DM-RS block and position of DM-RS blocks, or some combination thereof.

In some embodiments, the same length of DM-RS block is inserted across some or all the blocks within the scheduled transmission/reception. In alternate embodiments, different lengths of DM-RS blocks can be configured/indicated to the UE, e.g., one DM-RS block can have size N, while another DM-RS block can have size M, where M is not always equal to N.

In some embodiments, the same length of DM-RS block is inserted across some or all of the blocks with same number of repeated blocks as shown in FIG. 5. In alternate embodiments, different repetition factors might apply to the DM-RS blocks at different instance. For example, at the beginning of TTI, the first DM-RS block is repeated two times, while the second DM-RS block (somewhere in the middle of TTI) may be repeated once. Such configuration can be either explicitly or implicitly signaled to the UE. In alternate embodiments, different length of DM-RS block can be configured/indicated to the UE such as one DM-RS block can have size N, while other DM-RS block can have size M, where M is not always equal to N.

In some embodiments, a combination of DM-RS blocks and guard intervals can be applied. For example, within the TTI, the DM-RS block is inserted at the beginning of first PDSCH/PUSCH block for channel estimation. However, during the remaining TTI, a guard interval is inserted between PDSCH/PUSCH blocks. The exact configuration can be either preconfigured as a default configuration or additional configurations can be indicated.

It is noted that that above configurations are also applicable to control channels such as PDCCH/PUCCH.

In some embodiments, when the UE is configured to monitor UE-specific PDCCH (e.g., DCI), and also scheduled with PDSCH in the same TTI, then the same DM-RS block can be used to estimate the channel for both PDCCH and PDSCH. In one implementation, at least one DM-RS block is present at the beginning of PDCCH block. In an alternate implementation, at least two DM-RS blocks are present, where the first DM-RS block is present at the beginning of PDCCH block, and another DM-RS block is present before the PDSCH blocks. In some implementations, multiple DM-RS blocks can be inserted with PDCCH block, where the specific configuration can be either preconfigured or explicitly indicated to the UE, for example, via search space configuration.

In some embodiments, the length of the DM-RS block for PDCCH is determined based on DCI format, aggregation level, frequency repetition, or some combination thereof.

In a second embodiment directed to DL/UL DM-RS Configuration using Type 3, the UE is semi statically configured with a DM-RS type 3 (or some other configuration number can be used) for PDSCH and PUSCH using IEs DMRS-DownlinkConfig and DMRS-UplinkConfig, respectively. In one implementation, when configured with Type 3, UE generates a time domain sequence g(n) for DM-RS based on pseudo-random sequence initialized/scrambled with an ID signalled semi-statically or is scrambled with a cell ID. The UE may assume the sequence g(n) is scaled by a factor $$\beta_{PDSCH}^{DMRS}$$

for PDSCH transmission power adjustment. The length of the sequence is taken according to a new field 'DM-RS length' in IEs DMRS-DownlinkConfig and DMRS-UplinkConfig. If this field is missing, then by default the length is according to the normal CP. The sequence is mapped to time domain at the start of each block l. If field dmrs-AdditionalPosition is present with type 3, it may refer to the block location l, where additional DM-RS blocks are to be placed using specified mapping type, defined in Table 7.4.1.1.2-3 of TS 38.211. In one implementation, a new mapping type for configuration type 3 is added to this table. If no mapping type is indicated, then by default it will use mapping Type A. If field dmrs-AdditionalPosition is not present with type 3, no additional DM-RS will be added. An illustration of the DMRS-DownlinkConfig IE is shown in FIG. 7.

Figure 8:
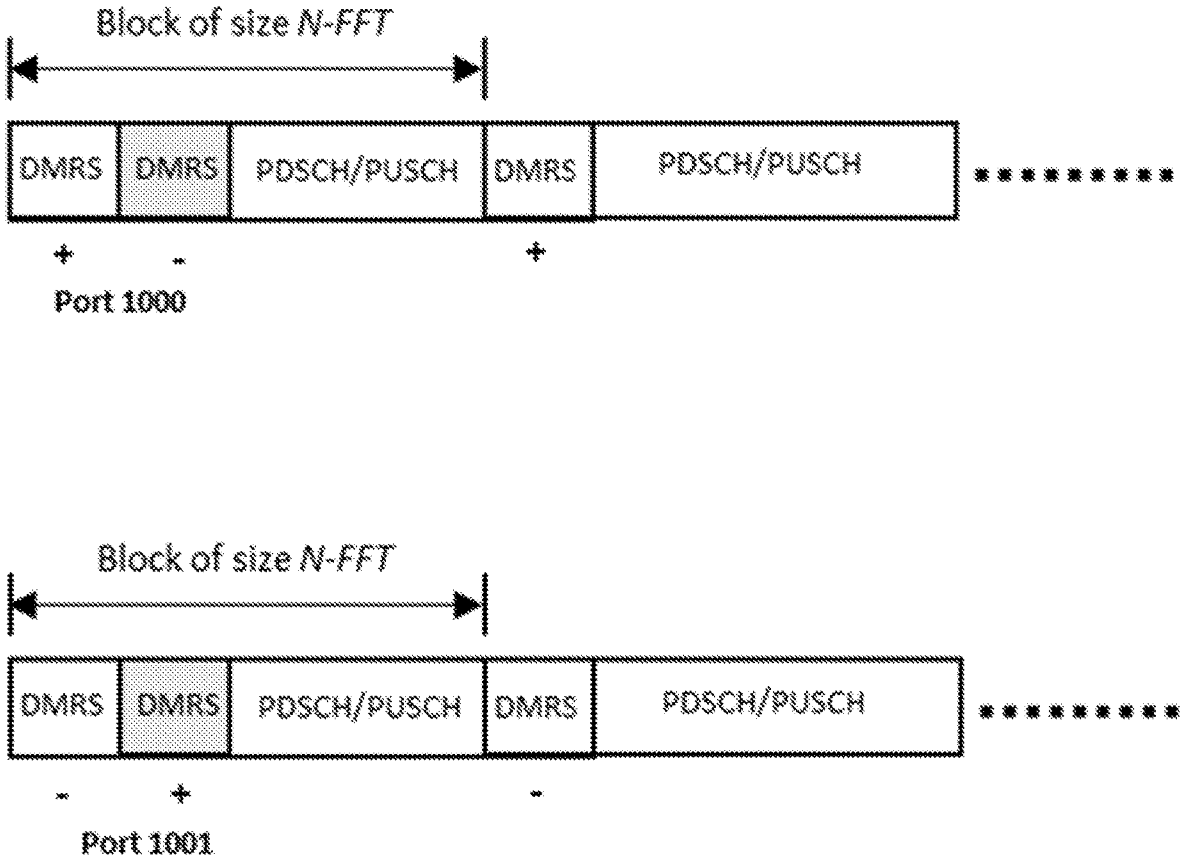
FIG. 8 depicts a diagram of time domain code division multiplexing ("CDM") for multi-port DM-RS.

The CDM/optical communication channel ("OCC") for configuration type 3 is performed only in time domain for the configurations where more than one DM-RS blocks are used in a block. For example, if two DM-RS blocks are used in a FFT size block 1, then two ports with TD-CDM2 may be used, as shown in FIG. 8.

Table 7.4.1.1.2-1 in TS 38.211 for mapping DM-RS with different CDM groups/ports is modified accordingly to include time domain CDM mapping. For example, for the case, where i=0,1 (two blocks of DM-RS as in FIG. 8), the table will be as:

TABLE 2

Example parameters for DM-RS configuration type 3

| p | CDM group | Δ | $w_t$ (l') l' = 0 | l'' = 1 |
|---|---|---|---|---|
| 100011 | 0 | 0 | +1 | −1 |
| 1001 | 0 | 0 | −1 | +1 |

In case more DM-RS blocks are used inside an FFT size block/(increasing l' in Table 7.4.1.1.2-1 in TS 38.211, i.e., l'=0, 1, 2, . . . ), then more CDM configurations may be applied in the time domain on a similar fashion, resulting in more antenna ports.

In some embodiments, a different cyclic shift can be applied to DM-RS sequence and can be associated with different DM-RS ports. In one implementation, the number of DM-RS ports is equal to number of cyclic shifts that can be applied to DM-RS sequence to provide orthogonality. In alternate implementations, the orthogonal DM-RS ports can be applied by combinations of CDM in time domain and cyclic shifts to the DM-RS sequence.

Figure 9:
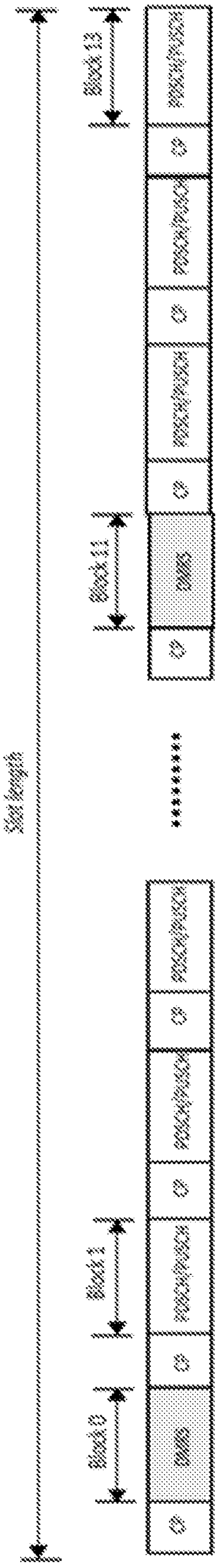
FIG. 9 depicts a diagram of DM-RS configuration Type 4.

In a third embodiment, directed to dedicated blocks for DM-RS, DM-RS configuration Type 4, at least one complete time domain block length is dedicated for DM-RS where, inside the block length, variable DM-RS densities may be configured to accommodate multi-port DM-RS, as shown in FIG. 9. DM-RS may not be part of guard interval and a cyclic prefix is inserted to each block to fulfil the cyclic convolutional property. Such configuration may be named as DM-RS configuration type 4 and is primarily associated with single carrier waveform.

In one embodiment, the UE generates a time domain sequence g(n) for DM-RS based on pseudo-random sequence initialized/scrambled with an ID signaled semi-statically or is scrambled with a cell ID. For PDSCH, the UE may assume the sequence g(n) is scaled by a factor $$\beta_{PDSCH}^{DMRS}$$

for transmission power adjustment. The mapping to time domain resource elements $(s, l)_p$ according to $$a_{s,l}^{(p)} = \beta_{PDSCH}^{DMRS} w_s(s') \, w_t(l') \, g(2n + s')$$

$$s = \{0, 1, \ldots N\}$$

$$l = \bar{l} + l'$$

$$n = 0, 1, \ldots$$

Where s is the time domain symbol index in block l, N is the symbol length, e.g., total number of symbols in a block, I is the time-domain block index, $w_s(s')$ is either +1 or −1 for all samples in a DM-RS block, and p is the antenna port.

Figure 10:
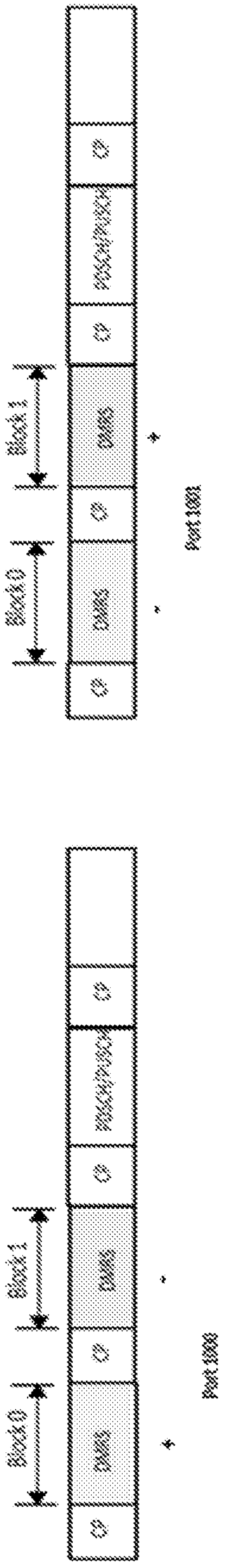
FIG. 10 depicts a diagram of time domain CDM for double block DM-RS.

In one implementaion, shown in FIG. 10, a full density single block is used for DM-RS. In such an embodiment, only one antenna ports is available. However, if double blocks are used for DM-RS, then two antenna ports are possible. The Tables 6.4.1.1.3-1, 6.4.1.1.3-2, 7.4.1.1.2-1, and 7.4.1.1.2-2 in TS 38.211 for PUSCH and PDSCH used for mapping DM-RS with different CDM groups/ports are then modified and are similar to the Table 2 shown above for configuration type 3.

In another implementation, the density inside the DM-RS block is varied to accommodate more ports (similar to configuration type 1 and configuration type 2). For example, every other time domain position in the DM-RS block is not used. In this manner, up to two ports may be used for single block DM-RS and up to four ports if two blocks are used. The Tables 6.4.1.1.3-1, 6.4.1.1.3-2, 7.4.1.1.2-1, and 7.4.1.1.2-2 in TS 38.211 for PUSCH and PDSCH are modified accordingly as shown in Table 3.

TABLE 3

Example parameters for DM-RS configuration type 4 with alternative DM-RS symbol placing

| p | CDM group | Δ | $w_s$ (s'), s' = 0 | $w_s$ (s'), s' = 1 | $w_t$ (l'), l' = 0 | $w_t$ (l'), l' = 1 |
|---|---|---|---|---|---|---|
| 100011 | 0 | 0 | +1 | +1 | +1 | +1 |
| 1001 | 0 | 0 | +1 | −1 | +1 | +1 |
| 1002 | 0 | 0 | +1 | +1 | +1 | −1 |
| 1003 | 0 | 0 | +1 | −1 | +1 | −1 |

In one implementation, more gaps between DM-RS placing may be employed. In this way, more antenna ports may be configured. In some embodiments, DM-RS mapping is done such that partial interference among antenna ports DM-RS sequences are allowed. In this way, the DM-RS enjoys a higher time-domain density, while enabling the coexistence of multiple DL transmissions at the same channel.

In some embodiments, a combination of the Type 3 DM-RS and Type 4 DM-RS shall be configured simultaneously within a slot. In some implementations, an initial Type 4 DM-RS is utilized for initiating the CSI estimate and a variation of Type 3 DM-RS is utilized thereafter for CSI tracking. In some embodiments, the utilization of DM-RS Type 4, the choice of DM-RS Type 4 density is triggered/requested by the UE.

In a fourth embodiment, directed to enhanced DM-RS port indication, multiple port indication tables can be configured to the UE and one of the multiple configured table is used for indicating the one or multiple ports for DL reception and/or UL transmission at the UE. The number of configured port tables is dependent up on the number of DM-RS blocks (with different DM-RS ports, not repetition of same DMRS block) configured. In one implementation, when a single DM-RS block is configured, then the port indication table, as illustrated in Table 4 can be used to indicate up to 2 DM-RS ports. In this example, the column indicating number of unscheduled DMRS ports is to indicate to a UE, if the remaining ports are used for other UEs or not. This is to indicate MU-MIMO mode effectively. In an alternate example, the table without the column to indicate the number of unscheduled DMRS ports can be applied. Please note that term "Number of unscheduled DMRS ports" is an example and other terms could be used as well such as "Number of empty DMRS ports."

TABLE 4

Antenna port(s), single carrier waveform enabled, maxDMRSblocks = 1

| Value | Number of unscheduled DMRS ports | DMRS port(s) |
|---|---|---|
| 0 | 1 | 0 |
| 1 | 0 | 0 |
| 2 | 0 | 1 |
| 3 | 0 | 0, 1 |

In one implementation, when up to 2 DM-RS blocks can be configured, then the port indication table, as illustrated in Table 5 can be used to indicate up to 4 DM-RS ports.

TABLE 5

Antenna port(s), single carrier waveform enabled, maxDMRSblocks = 2

| Value | Number of unscheduled DMRS ports within same CDM group | DMRS port(s) | # of DMRS blocks |
|---|---|---|---|
| 0 | 1 | 0 | 1 |
| 1 | 0 | 0 | 1 |
| 2 | 0 | 1 | 1 |
| 3 | 0 | 0, 1 | 1 |
| 4 | 1 | 2 | 2 |
| 5 | 0 | 2 | 2 |
| 6 | 0 | 3 | 2 |
| 7 | 0 | 2, 3 | 2 |
| 8 | 1 | 0, 1, 2 | 2 |
| 9 | 0 | 0, 1, 2 | 2 |
| 10 | 0 | 0, 1, 2, 3 | 2 |
| 11-15 | Reserved | Reserved | Reserved |

Figure 11:
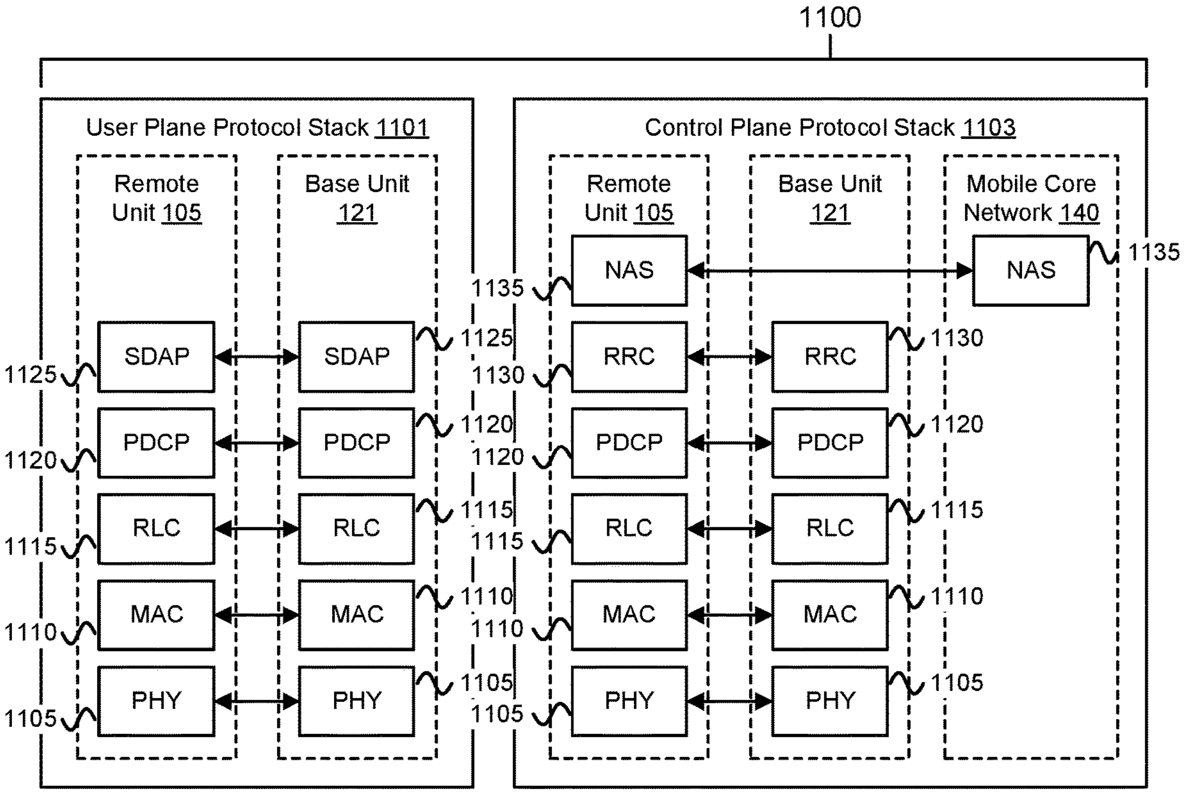
FIG. 11 is a diagram illustrating one embodiment of a NR protocol stack.

FIG. 11 depicts a NR protocol stack 1100, according to embodiments of the disclosure. While FIG. 11 shows the remote unit 105, the base unit 121 and the mobile core network 130, these are representative of a set of UEs interacting with a RAN node and a NF (e.g., AMF) in a core network. As depicted, the protocol stack 1100 comprises a User Plane protocol stack 1105 and a Control Plane protocol stack 1110. The User Plane protocol stack 1101 includes a physical ("PHY") layer 1105, a Medium Access Control ("MAC") sublayer 1110, a Radio Link Control ("RLC") sublayer 1115, a Packet Data Convergence Protocol ("PDCP") sublayer 1120, and Service Data Adaptation Protocol ("SDAP") sublayer 1125. The Control Plane protocol stack 1103 also includes a physical layer 1105, a MAC sublayer 1110, a RLC sublayer 1115, and a PDCP sublayer 1120. The Control Place protocol stack 1103 also includes a Radio Resource Control ("RRC") sublayer 1130 and a Non-Access Stratum ("NAS") layer 1135.

The AS protocol stack for the Control Plane protocol stack 1103 consists of at least RRC, PDCP, RLC and MAC sublayers, and the physical layer. The AS protocol stack for the User Plane protocol stack 1101 consists of at least SDAP, PDCP, RLC and MAC sublayers, and the physical layer. The Layer-2 ("L2") is split into the SDAP, PDCP, RLC and MAC sublayers. The Layer-3 ("L3") includes the RRC sublayer 1130 and the NAS layer 1135 for the control plane and includes, e.g., an Internet Protocol ("IP") layer or PDU Layer (note depicted) for the user plane. L1 and L2 are referred to as "lower layers" such as PUCCH/PUSCH or MAC CE, while L3 and above (e.g., transport layer, application layer) are referred to as "higher layers" or "upper layers" such as RRC.

The physical layer 1105 offers transport channels to the MAC sublayer 1110. The MAC sublayer 1110 offers logical channels to the RLC sublayer 1115. The RLC sublayer 1115 offers RLC channels to the PDCP sublayer 1120. The PDCP sublayer 1120 offers radio bearers to the SDAP sublayer 1125 and/or RRC layer 1130. The SDAP sublayer 1125 offers QoS flows to the mobile core network 130 (e.g., 5GC). The RRC sublayer 1130 provides for the addition, modification, and release of Carrier Aggregation and/or Dual Connectivity. The RRC sublayer 1130 also manages the establishment, configuration, maintenance, and release of Signaling Radio Bearers ("SRBs") and Data Radio Bearers ("DRBs"). In certain embodiments, a RRC entity functions for detection of and recovery from radio link failure.

Figure 12:
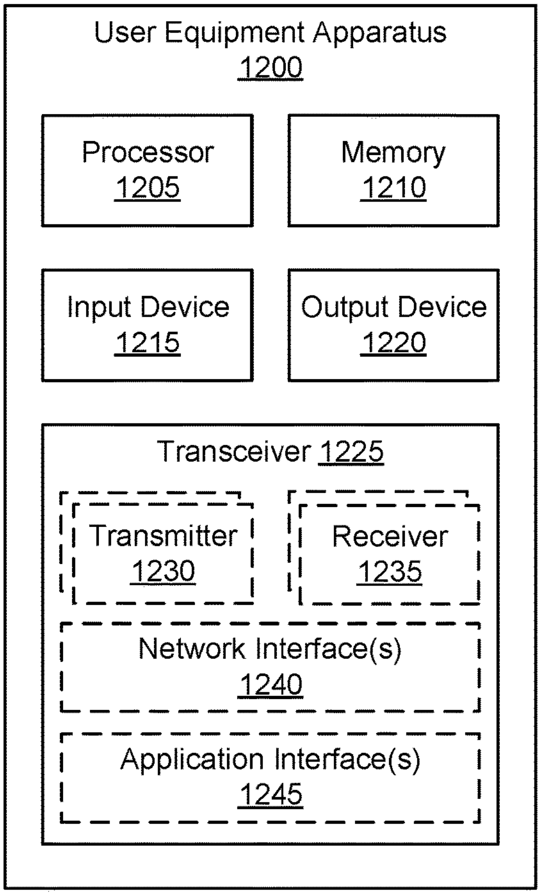
FIG. 12 is a block diagram illustrating one embodiment of a user equipment apparatus that may be used for DM-RS types with time-domain resource allocation.

FIG. 12 depicts a user equipment apparatus 1200 that may be used for DM-RS types with time-domain resource allocation, according to embodiments of the disclosure. In various embodiments, the user equipment apparatus 1200 is used to implement one or more of the solutions described above. The user equipment apparatus 1200 may be one embodiment of a UE, such as the remote unit 105 and/or the UE 205, as described above. Furthermore, the user equipment apparatus 1200 may include a processor 1205, a memory 1210, an input device 1215, an output device 1220, and a transceiver 1225. In some embodiments, the input device 1215 and the output device 1220 are combined into a single device, such as a touchscreen. In certain embodiments, the user equipment apparatus 1200 may not include any input device 1215 and/or output device 1220. In various embodiments, the user equipment apparatus 1200 may include one or more of: the processor 1205, the memory 1210, and the transceiver 1225, and may not include the input device 1215 and/or the output device 1220.

As depicted, the transceiver 1225 includes at least one transmitter 1230 and at least one receiver 1235. Here, the transceiver 1225 communicates with one or more base units 121. Additionally, the transceiver 1225 may support at least one network interface 1240 and/or application interface 1245. The application interface(s) 1245 may support one or more APIs. The network interface(s) 1240 may support 3GPP reference points, such as Uu and PC5. Other network interfaces 1240 may be supported, as understood by one of ordinary skill in the art.

The processor 1205, in one embodiment, may include any known controller capable of executing computer-readable instructions and/or capable of performing logical operations. For example, the processor 1205 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 1205 executes instructions stored in the memory 1210 to perform the methods and routines described herein. The processor 1205 is communicatively coupled to the memory 1210, the input device 1215, the output device 1220, and the transceiver 1225. In certain embodiments, the processor 1205 may include an application processor (also known as "main processor") which manages application-domain and operating system ("OS") functions and a baseband processor (also known as "baseband radio processor") which manages radio functions.

The memory 1210, in one embodiment, is a computer readable storage medium. In some embodiments, the memory 1210 includes volatile computer storage media. For example, the memory 1210 may include a RAM, including dynamic RAM ("DRAM"), synchronous dynamic RAM ("SDRAM"), and/or static RAM ("SRAM"). In some embodiments, the memory 1210 includes non-volatile computer storage media. For example, the memory 1210 may include a hard disk drive, a flash memory, or any other suitable non-volatile computer storage device. In some embodiments, the memory 1210 includes both volatile and non-volatile computer storage media.

In some embodiments, the memory 1210 stores data related to CSI enhancements for higher frequencies. For example, the memory 1210 may store parameters, configurations, resource assignments, policies, and the like as described above. In certain embodiments, the memory 1210 also stores program code and related data, such as an operating system or other controller algorithms operating on the user equipment apparatus 1200, and one or more software applications.

The input device 1215, in one embodiment, may include any known computer input device including a touch panel, a button, a keyboard, a stylus, a microphone, or the like. In some embodiments, the input device 1215 may be integrated with the output device 1220, for example, as a touchscreen or similar touch-sensitive display. In some embodiments, the input device 1215 includes a touchscreen such that text may be input using a virtual keyboard displayed on the touchscreen and/or by handwriting on the touchscreen. In some embodiments, the input device 1215 includes two or more different devices, such as a keyboard and a touch panel.

The output device 1220, in one embodiment, is designed to output visual, audible, and/or haptic signals. In some embodiments, the output device 1220 includes an electronically controllable display or display device capable of outputting visual data to a user. For example, the output device 1220 may include, but is not limited to, an LCD display, an LED display, an OLED display, a projector, or similar display device capable of outputting images, text, or the like to a user. As another, non-limiting, example, the output device 1220 may include a wearable display separate from, but communicatively coupled to, the rest of the user equipment apparatus 1200, such as a smart watch, smart glasses, a heads-up display, or the like. Further, the output device 1220 may be a component of a smart phone, a personal digital assistant, a television, a table computer, a notebook (laptop) computer, a personal computer, a vehicle dashboard, or the like.

In certain embodiments, the output device 1220 includes one or more speakers for producing sound. For example, the output device 1220 may produce an audible alert or notification (e.g., a beep or chime). In some embodiments, the output device 1220 includes one or more haptic devices for producing vibrations, motion, or other haptic feedback. In some embodiments, all, or portions of the output device 1220 may be integrated with the input device 1215. For example, the input device 1215 and output device 1220 may form a touchscreen or similar touch-sensitive display. In other embodiments, the output device 1220 may be located near the input device 1215.

The transceiver 1225 includes at least transmitter 1230 and at least one receiver 1235. The transceiver 1225 may be used to provide UL communication signals to a base unit 121 and to receive DL communication signals from the base unit 121, as described herein. Similarly, the transceiver 1225 may be used to transmit and receive SL signals (e.g., V2X communication), as described herein. Although only one transmitter 1230 and one receiver 1235 are illustrated, the user equipment apparatus 1200 may have any suitable number of transmitters 1230 and receivers 1235. Further, the transmitter(s) 1230 and the receiver(s) 1235 may be any suitable type of transmitters and receivers. In one embodiment, the transceiver 1225 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 1225, transmitters 1230, and receivers 1235 may be implemented as physically separate components that access a shared hardware resource and/or software resource, such as for example, the network interface 1240.

In various embodiments, one or more transmitters 1230 and/or one or more receivers 1235 may be implemented and/or integrated into a single hardware component, such as a multi-transceiver chip, a system-on-a-chip, an ASIC, or other type of hardware component. In certain embodiments, one or more transmitters 1230 and/or one or more receivers 1235 may be implemented and/or integrated into a multi-chip module. In some embodiments, other components such as the network interface 1240 or other hardware components/circuits may be integrated with any number of transmitters 1230 and/or receivers 1235 into a single chip. In such embodiment, the transmitters 1230 and receivers 1235 may be logically configured as a transceiver 1225 that uses one more common control signals or as modular transmitters 1230 and receivers 1235 implemented in the same hardware chip or in a multi-chip module.

In one embodiment, the processor 1205 is configured to receive, via the transceiver 1225, a DM-RS configuration from a network, the DM-RS configuration comprising a time domain occasion of a DM-RS sequence within a block duration of a single carrier waveform, a time domain pattern of the DM-RS sequence, and a sequence length of the DM-RS sequence. In one embodiment, the processor 1205 is configured to receive a DM-RS sequence within the block duration of the single carrier waveform according to the received DM-RS configuration, receive a data sequence that is quasi-collocated with an associated DM-RS resource, and demodulate the received data sequence using the DM-RS sequence.

In one embodiment, DM-RS blocks of guard interval length are inserted periodically in the time domain occasion of a block of FFT length data.

In one embodiment, a combination of the DM-RS used as a guard interval inside an N-FFT block and DM-RS employed as a whole block length with a random guard interval are configured simultaneously.

In one embodiment, lengths of one or more additional DM-RS blocks are cyclically extended within an N-FFT block.

In one embodiment, the length of the one or more additional DM-RS blocks is the same as a length of a first DM-RS block.

In one embodiment, the length of the one or more additional DM-RS blocks is variable such that the length is increased by a factor of a length of a first DM-RS block.

In one embodiment, the one or more additional DM-RS blocks are inserted at specified block numbers.

In one embodiment, the length of the one or more additional DM-RS blocks may be indicated explicitly or implicitly.

In one embodiment, at least a partial DM-RS block length extension is indicated using at least two variables in DCI.

In one embodiment, the length of the one or more additional DM-RS blocks and a location of the one or more additional DM-RS blocks is fixed for different N-FFT block sizes and wherein various mapping types for the one or more DM-RS blocks are predefined in the DM-RS configuration.

In one embodiment, a position at the location of the one or more additional DM-RS blocks is indicated using a field dmrs-AdditionalPosition in a DM-RS information element.

In one embodiment, the one or more additional DM-RS blocks are used to accommodate multi-port DM-RS.

In one embodiment, at least one complete time domain block length is dedicated for DM-RS, variable DM-RS densities configured inside the time domain block length to accommodate multi-port DM-RS.

In one embodiment, in response to DM-RS not being part of a guard interval, a cyclic prefix is inserted in each DM-RS block to fulfill a cyclic convolutional property.

In one embodiment, the processor 1205 is configured to trigger a modification in the DM-RS parameters, including a DM-RS duration, a DM-RS type, a DM-RS power, or some combination thereof.

In one embodiment, the DM-RS is applicable to PDSCH, PUSCH, PDCCH, or PUCCH.

In one embodiment, the processor 1205 is configured to cause the DM-RS configuration to be applied to multi-carrier waveforms.

Figure 13:
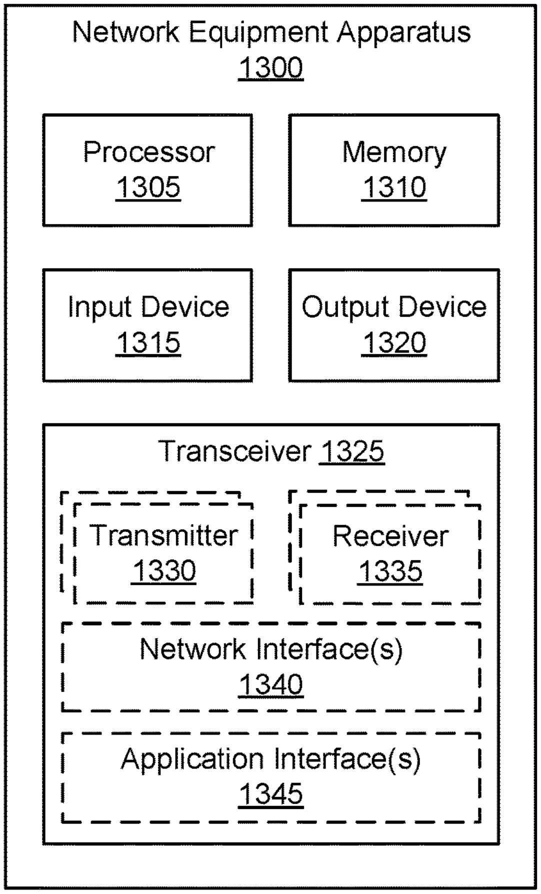
FIG. 13 is a block diagram illustrating one embodiment of a network apparatus that may be used for DM-RS types with time-domain resource allocation.

FIG. 13 depicts one embodiment of a network apparatus 1300 that may be used for DM-RS types with time-domain resource allocation, according to embodiments of the disclosure. In some embodiments, the network apparatus 1300 may be one embodiment of a RAN node and its supporting hardware, such as the base unit 121 and/or gNB, described above. Furthermore, network apparatus 1300 may include a processor 1305, a memory 1310, an input device 1315, an output device 1320, and a transceiver 1325. In certain embodiments, the network apparatus 1300 does not include any input device 1315 and/or output device 1320.

As depicted, the transceiver 1325 includes at least one transmitter 1330 and at least one receiver 1335. Here, the transceiver 1325 communicates with one or more remote units 105. Additionally, the transceiver 1325 may support at least one network interface 1340 and/or application interface 1345. The application interface(s) 1345 may support one or more APIs. The network interface(s) 1340 may support 3GPP reference points, such as Uu, N1, N2, N3, N5, N6 and/or N7 interfaces. Other network interfaces 1340 may be supported, as understood by one of ordinary skill in the art.

When implementing an NEF, the network interface(s) 1340 may include an interface for communicating with an application function (i.e., N5) and with at least one network function (e.g., UDR, SFC function, UPF) in a mobile communication network, such as the mobile core network 130.

The processor 1305, in one embodiment, may include any known controller capable of executing computer-readable instructions and/or capable of performing logical operations. For example, the processor 1305 may be a microcontroller, a microprocessor, a CPU, a GPU, an auxiliary processing unit, a FPGA, a DSP, a co-processor, an application-specific processor, or similar programmable controller. In some embodiments, the processor 1305 executes instructions stored in the memory 1310 to perform the methods and routines described herein. The processor 1305 is communicatively coupled to the memory 1310, the input device 1315, the output device 1320, and the transceiver 1325. In certain embodiments, the processor 1305 may include an application processor (also known as "main processor") which manages application-domain and OS functions and a baseband processor (also known as "baseband radio processor") which manages radio function. In various embodiments, the processor 1305 controls the network apparatus 1300 to implement the above described network entity behaviors (e.g., of the gNB) for DM-RS types with time-domain resource allocation.

The memory 1310, in one embodiment, is a computer readable storage medium. In some embodiments, the memory 1310 includes volatile computer storage media. For example, the memory 1310 may include a RAM, including DRAM, SDRAM, and/or SRAM. In some embodiments, the memory 1310 includes non-volatile computer storage media. For example, the memory 1310 may include a hard disk drive, a flash memory, or any other suitable non-volatile computer storage device. In some embodiments, the memory 1310 includes both volatile and non-volatile computer storage media.

In some embodiments, the memory 1310 stores data relating to CSI enhancements for higher frequencies. For example, the memory 1310 may store parameters, configurations, resource assignments, policies, and the like as described above. In certain embodiments, the memory 1310 also stores program code and related data, such as an OS or other controller algorithms operating on the network apparatus 1300, and one or more software applications.

The input device 1315, in one embodiment, may include any known computer input device including a touch panel, a button, a keyboard, a stylus, a microphone, or the like. In some embodiments, the input device 1315 may be integrated with the output device 1320, for example, as a touchscreen or similar touch-sensitive display. In some embodiments, the input device 1315 includes a touchscreen such that text may be input using a virtual keyboard displayed on the touchscreen and/or by handwriting on the touchscreen. In some embodiments, the input device 1315 includes two or more different devices, such as a keyboard and a touch panel.

The output device 1320, in one embodiment, may include any known electronically controllable display or display device. The output device 1320 may be designed to output visual, audible, and/or haptic signals. In some embodiments, the output device 1320 includes an electronic display capable of outputting visual data to a user. Further, the output device 1320 may be a component of a smart phone, a personal digital assistant, a television, a table computer, a notebook (laptop) computer, a personal computer, a vehicle dashboard, or the like.

In certain embodiments, the output device 1320 includes one or more speakers for producing sound. For example, the output device 1320 may produce an audible alert or notification (e.g., a beep or chime). In some embodiments, the output device 1320 includes one or more haptic devices for producing vibrations, motion, or other haptic feedback. In some embodiments, all, or portions of the output device 1320 may be integrated with the input device 1315. For example, the input device 1315 and output device 1320 may form a touchscreen or similar touch-sensitive display. In other embodiments, all, or portions of the output device 1320 may be located near the input device 1315.

As discussed above, the transceiver 1325 may communicate with one or more remote units and/or with one or more interworking functions that provide access to one or more PLMNs. The transceiver 1325 may also communicate with one or more network functions (e.g., in the mobile core network 80). The transceiver 1325 operates under the control of the processor 1305 to transmit messages, data, and other signals and also to receive messages, data, and other signals. For example, the processor 1305 may selectively activate the transceiver (or portions thereof) at particular times in order to send and receive messages.

The transceiver 1325 may include one or more transmitters 1330 and one or more receivers 1335. In certain embodiments, the one or more transmitters 1330 and/or the one or more receivers 1335 may share transceiver hardware and/or circuitry. For example, the one or more transmitters 1330 and/or the one or more receivers 1335 may share antenna(s), antenna tuner(s), amplifier(s), filter(s), oscillator(s), mixer(s), modulator/demodulator(s), power supply, and the like. In one embodiment, the transceiver 1325 implements multiple logical transceivers using different communication protocols or protocol stacks, while using common physical hardware.

In one embodiment, the processor 1305 is configured to transmit, via the transceiver 1325, a DM-RS configuration to a UE, the DM-RS configuration comprising a time domain occasion of a DM-RS sequence within a block duration of a single carrier waveform, a time domain pattern of the DM-RS sequence, and a sequence length of the DM-RS sequence. In one embodiment, the processor 1305 is configured to determine a DM-RS sequence for demodulating a data sequence that is quasi-collocated with an associated DM-RS resource, transmit the DM-RS sequence within the block duration of the single carrier waveform according to the received DM-RS configuration, and transmit the data sequence that is quasi-collocated with an associated DM-RS resource.

Figure 14:
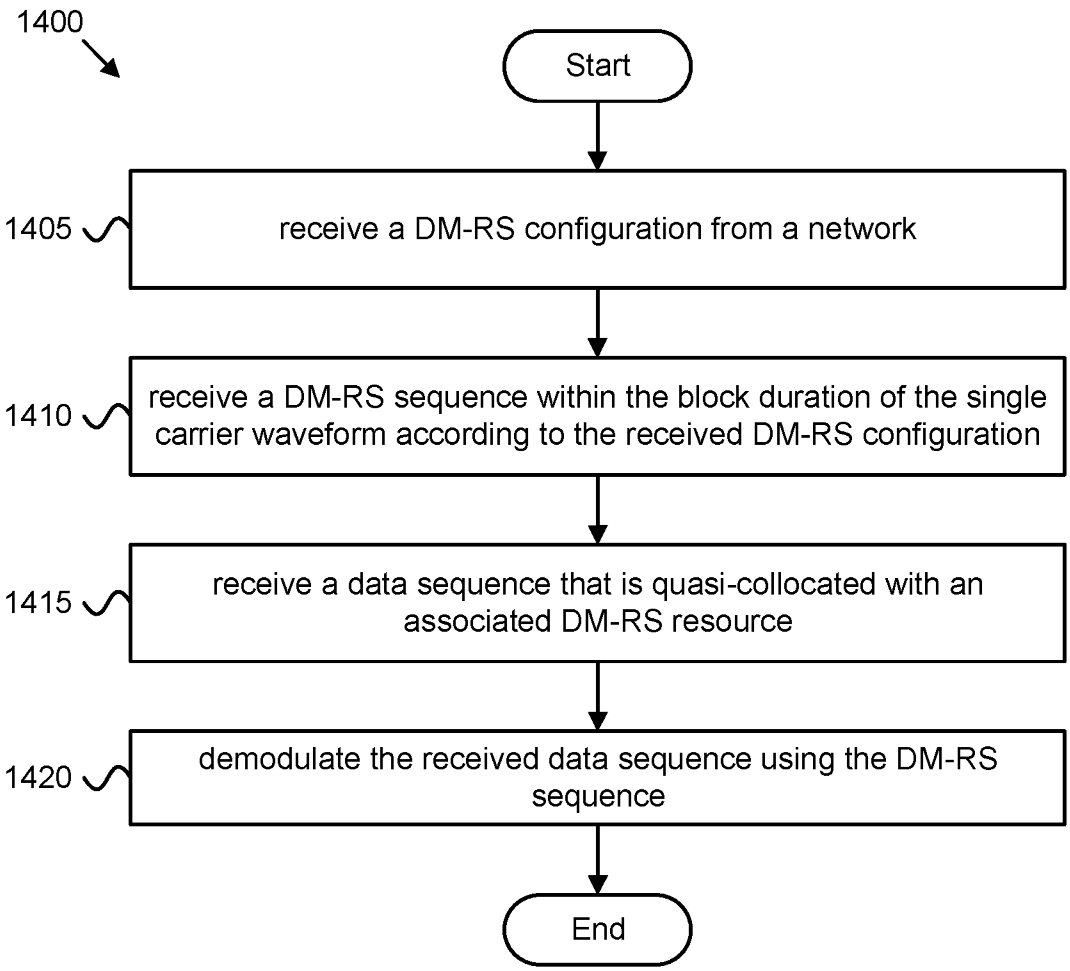
FIG. 14 is a flowchart diagram illustrating one embodiment of a method for DM-RS types with time-domain resource allocation.

FIG. 14 is a flowchart diagram of a method 1400 for DM-RS types with time-domain resource allocation. The method 1400 may be performed by a UE as described herein, for example, the remote unit 105 and/or the user equipment apparatus 1200. In some embodiments, the method 1400 may be performed by a processor executing program code, for example, a microcontroller, a microprocessor, a CPU, a GPU, an auxiliary processing unit, a FPGA, or the like.

In one embodiment, the method 1400 begins and receives 1405 a DM-RS configuration from a network. The DM-RS configuration may include a time domain occasion of a DM-RS sequence within a block duration of a single carrier waveform, a time domain pattern of the DM-RS sequence, and a sequence length of the DM-RS sequence. In one embodiment, the method 1400 receives 1410 a DM-RS sequence within the block duration of the single carrier waveform according to the received DM-RS configuration. In one embodiment, the method 1400 receives 1415 a data sequence that is quasi-collocated with an associated DM-RS resource. In one embodiment, the method 1400 demodulates 1420 the received data sequence using the DM-RS sequence, and the method 1400 ends.

Figure 15:
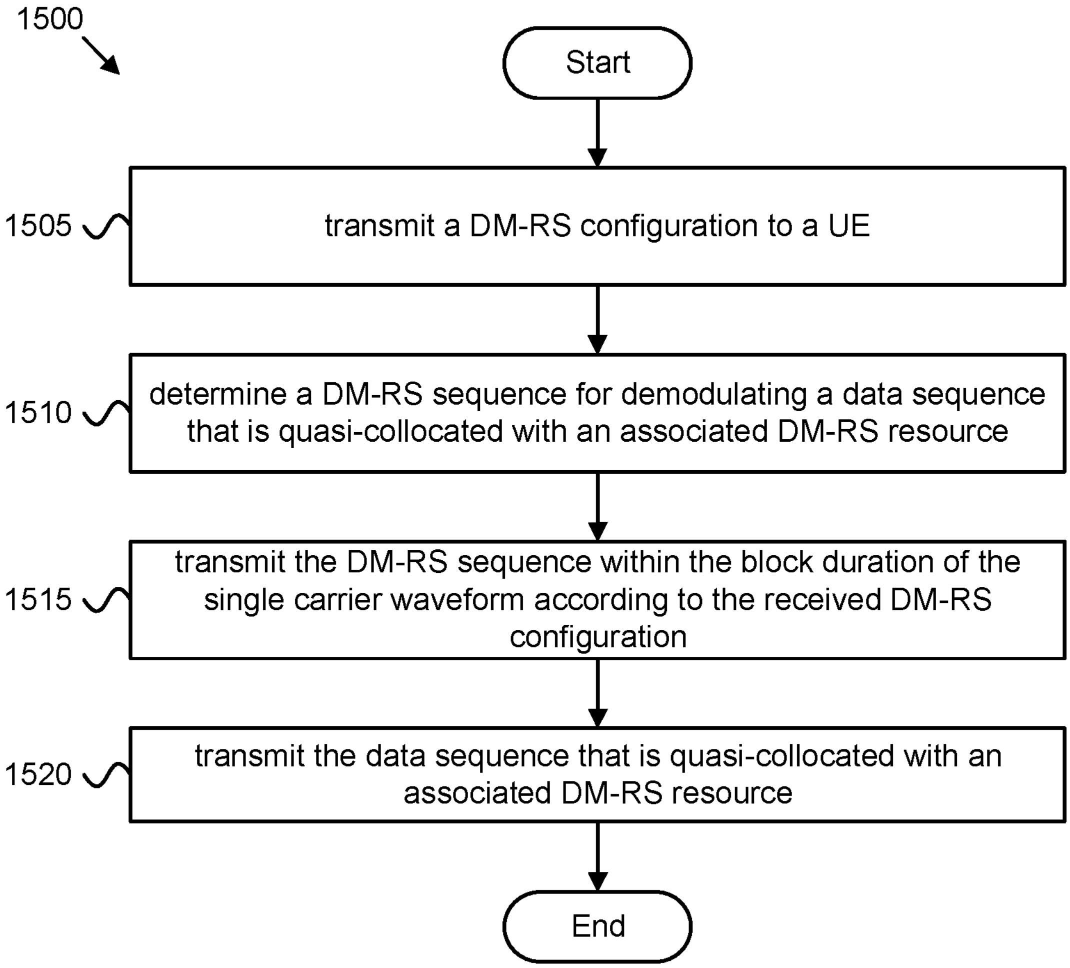
FIG. 15 is a flowchart diagram illustrating one embodiment of a method for DM-RS types with time-domain resource allocation.

FIG. 15 is a flowchart diagram of a method 1500 for DM-RS types with time-domain resource allocation. The method 1500 may be performed by a network entity as described herein, for example, the gNB, base unit 121, and/or the network equipment apparatus 1300. In some embodiments, the method 1500 may be performed by a processor executing program code, for example, a micro-controller, a microprocessor, a CPU, a GPU, an auxiliary processing unit, a FPGA, or the like.

In one embodiment, the method 1500 begins and transmits 1505 a DM-RS configuration to a UE. The DM-RS configuration may include a time domain occasion of a DM-RS sequence within a block duration of a single carrier waveform, a time domain pattern of the DM-RS sequence, and a sequence length of the DM-RS sequence. In one embodiment, the method 1500 determines 1510 a DM-RS sequence for demodulating a data sequence that is quasi-collocated with an associated DM-RS resource. In one embodiment, the method 1500 transmits 1515 the DM-RS sequence within the block duration of the single carrier waveform according to the received DM-RS configuration. In one embodiment, the method 1500 transmits 1520 the data sequence that is quasi-collocated with an associated DM-RS resource, and the method 1500 ends.

A first apparatus is disclosed for DM-RS types with time-domain resource allocation. The first apparatus may include a UE as described herein, for example, the remote unit 105 and/or the user equipment apparatus 1200. In some embodiments, the first apparatus may include a processor executing program code, for example, a microcontroller, a microprocessor, a CPU, a GPU, an auxiliary processing unit, a FPGA, or the like.

In one embodiment, the first apparatus includes a transceiver and a processor coupled to the transceiver. In one embodiment, the processor is configured to cause the first apparatus to receive a DM-RS configuration from a network, the DM-RS configuration comprising a time domain occasion of a DM-RS sequence within a block duration of a single carrier waveform, a time domain pattern of the DM-RS sequence, and a sequence length of the DM-RS sequence. In one embodiment, the processor is configured to cause the first apparatus to receive a DM-RS sequence within the block duration of the single carrier waveform according to the received DM-RS configuration, receive a data sequence that is quasi-collocated with an associated DM-RS resource, and demodulate the received data sequence using the DM-RS sequence.

In one embodiment, DM-RS blocks of guard interval length are inserted periodically in the time domain occasion of a block of FFT length data.

In one embodiment, a combination of the DM-RS used as a guard interval inside an N-FFT block and DM-RS employed as a whole block length with a random guard interval are configured simultaneously.

In one embodiment, lengths of one or more additional DM-RS blocks are cyclically extended within an N-FFT block.

In one embodiment, the length of the one or more additional DM-RS blocks is the same as a length of a first DM-RS block.

In one embodiment, the length of the one or more additional DM-RS blocks is variable such that the length is increased by a factor of a length of a first DM-RS block.

In one embodiment, the one or more additional DM-RS blocks are inserted at specified block numbers.

In one embodiment, the length of the one or more additional DM-RS blocks may be indicated explicitly or implicitly.

In one embodiment, at least a partial DM-RS block length extension is indicated using at least two variables in DCI.

In one embodiment, the length of the one or more additional DM-RS blocks and a location of the one or more additional DM-RS blocks is fixed for different N-FFT block sizes and wherein various mapping types for the one or more DM-RS blocks are predefined in the DM-RS configuration.

In one embodiment, a position at the location of the one or more additional DM-RS blocks is indicated using a field dmrs-AdditionalPosition in a DM-RS information element.

In one embodiment, the one or more additional DM-RS blocks are used to accommodate multi-port DM-RS.

In one embodiment, at least one complete time domain block length is dedicated for DM-RS, variable DM-RS densities configured inside the time domain block length to accommodate multi-port DM-RS.

In one embodiment, in response to DM-RS not being part of a guard interval, a cyclic prefix is inserted in each DM-RS block to fulfill a cyclic convolutional property.

In one embodiment, the processor is configured to cause the apparatus to trigger a modification in the DM-RS parameters, including a DM-RS duration, a DM-RS type, a DM-RS power, or some combination thereof.

In one embodiment, the DM-RS is applicable to PDSCH, PUSCH, PDCCH, or PUCCH.

In one embodiment, the processor is configured to cause the DM-RS configuration to be applied to multi-carrier waveforms.

A first method is disclosed for DM-RS types with time-domain resource allocation. The first method may be performed by a UE as described herein, for example, the remote unit 105 and/or the user equipment apparatus 1200. In some embodiments, the first method may be performed by a processor executing program code, for example, a micro-controller, a microprocessor, a CPU, a GPU, an auxiliary processing unit, a FPGA, or the like.

In one embodiment, the first method receives a DM-RS configuration from a network, the DM-RS configuration comprising a time domain occasion of a DM-RS sequence within a block duration of a single carrier waveform, a time domain pattern of the DM-RS sequence, and a sequence length of the DM-RS sequence. In one embodiment, the first method receives a DM-RS sequence within the block duration of the single carrier waveform according to the received DM-RS configuration, receives a data sequence that is quasi-collocated with an associated DM-RS resource, and demodulates the received data sequence using the DM-RS sequence.

In one embodiment, DM-RS blocks of guard interval length are inserted periodically in the time domain occasion of a block of FFT length data.

In one embodiment, a combination of the DM-RS used as a guard interval inside an N-FFT block and DM-RS employed as a whole block length with a random guard interval are configured simultaneously.

In one embodiment, lengths of one or more additional DM-RS blocks are cyclically extended within an N-FFT block.

In one embodiment, the length of the one or more additional DM-RS blocks is the same as a length of a first DM-RS block.

In one embodiment, the length of the one or more additional DM-RS blocks is variable such that the length is increased by a factor of a length of a first DM-RS block.

In one embodiment, the one or more additional DM-RS blocks are inserted at specified block numbers.

In one embodiment, the length of the one or more additional DM-RS blocks may be indicated explicitly or implicitly.

In one embodiment, at least a partial DM-RS block length extension is indicated using at least two variables in DCI.

In one embodiment, the length of the one or more additional DM-RS blocks and a location of the one or more additional DM-RS blocks is fixed for different N-FFT block sizes and wherein various mapping types for the one or more DM-RS blocks are predefined in the DM-RS configuration.

In one embodiment, a position at the location of the one or more additional DM-RS blocks is indicated using a field dmrs-AdditionalPosition in a DM-RS information element.

In one embodiment, the one or more additional DM-RS blocks are used to accommodate multi-port DM-RS.

In one embodiment, at least one complete time domain block length is dedicated for DM-RS, variable DM-RS densities configured inside the time domain block length to accommodate multi-port DM-RS.

In one embodiment, in response to DM-RS not being part of a guard interval, a cyclic prefix is inserted in each DM-RS block to fulfill a cyclic convolutional property.

In one embodiment, the first method triggers a modification in the DM-RS parameters, including a DM-RS duration, a DM-RS type, a DM-RS power, or some combination thereof.

In one embodiment, the DM-RS is applicable to PDSCH, PUSCH, PDCCH, or PUCCH.

In one embodiment, the first method applies the DM-RS configuration to multi-carrier waveforms.

A second apparatus is disclosed for DM-RS types with time-domain resource allocation. The second apparatus may include a network entity as described herein, for example, the gNB, base unit 121, and/or the network equipment apparatus 1300. In some embodiments, the second apparatus may include a processor executing program code, for example, a microcontroller, a microprocessor, a CPU, a GPU, an auxiliary processing unit, a FPGA, or the like.

In one embodiment, the second apparatus includes a transceiver and a processor coupled to the transceiver. In one embodiment, the processor is configured to cause the second apparatus to transmit a DM-RS configuration to a UE, the DM-RS configuration comprising a time domain occasion of a DM-RS sequence within a block duration of a single carrier waveform, a time domain pattern of the DM-RS sequence, and a sequence length of the DM-RS sequence. In one embodiment, the processor is configured to cause the second apparatus to determine a DM-RS sequence for demodulating a data sequence that is quasi-collocated with an associated DM-RS resource, transmit the DM-RS sequence within the block duration of the single carrier waveform according to the received DM-RS configuration, and transmit the data sequence that is quasi-collocated with an associated DM-RS resource.

A second method is disclosed for DM-RS types with time-domain resource allocation. The second method may be performed by a network entity as described herein, for example, the gNB, base unit 121, and/or the network equipment apparatus 1300. In some embodiments, the second method may be performed by a processor executing program code, for example, a microcontroller, a microprocessor, a CPU, a GPU, an auxiliary processing unit, a FPGA, or the like.

In one embodiment, the second method transmits a DM-RS configuration to a UE, the DM-RS configuration comprising a time domain occasion of a DM-RS sequence within a block duration of a single carrier waveform, a time domain pattern of the DM-RS sequence, and a sequence length of the DM-RS sequence. In one embodiment, the second method determines a DM-RS sequence for demodulating a data sequence that is quasi-collocated with an associated DM-RS resource, transmit the DM-RS sequence within the block duration of the single carrier waveform according to the received DM-RS configuration, and transmit the data sequence that is quasi-collocated with an associated DM-RS resource.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
at least one memory; and
at least one processor coupled with the at least one memory and configured to cause the UE to:
receive a demodulation reference signal (DM-RS) configuration from a network, the DM-RS configuration comprising a time domain occasion of a DM-RS sequence within a block of fast Fourier transform (FFT) length of a single carrier waveform, a time domain pattern of the DM-RS sequence, and a sequence length of the DM-RS sequence;
receive the DM-RS sequence within the block of FFT length of the single carrier waveform according to the received DM-RS configuration, wherein the DM-RS sequence is a time-domain sequence mapped to time-domain symbols within the block;
receive a data sequence within a block of FFT length of the single carrier waveform that is quasi-collocated with an associated DM-RS resource; and
demodulate the received data sequence using the DM-RS sequence.

2. The UE of claim 1, wherein DM-RS blocks of guard interval length are inserted periodically in the time domain occasion of a block of fast Fourier transform (FFT) length data.

3. The UE of claim 2, wherein a combination of the DM-RS used as a guard interval inside an N-FFT block and DM-RS employed as a whole block length with a random guard interval are configured simultaneously.

4. The UE of claim 1, wherein lengths of one or more additional DM-RS blocks are cyclically extended within an N-fast Fourier transform (FFT) block.

5. The UE of claim 4, wherein the length of the one or more additional DM-RS blocks is the same as a length of a first DM-RS block.

6. The UE of claim 4, wherein the length of the one or more additional DM-RS blocks is variable such that the length is increased by a factor of a length of a first DM-RS block.

7. The UE of claim 4, wherein the one or more additional DM-RS blocks are inserted at specified block numbers.

8. The UE of claim 7, wherein at least a partial DM-RS block length extension is indicated using at least two variables in downlink control information (DCI).

9. The UE of claim 4, wherein the length of the one or more additional DM-RS blocks and a location of the one or more additional DM-RS blocks is fixed for different N-FFT block sizes and wherein various mapping types for the one or more additional DM-RS blocks are predefined in the DM-RS configuration.

10. The UE of claim 4, wherein the one or more additional DM-RS blocks are used to accommodate multi-port DM-RS.

11. The UE of claim 1, wherein at least one complete time domain block length is dedicated for DM-RS, and wherein variable DM-RS densities are configured inside the at least one complete time domain block length to accommodate multi-port DM-RS.

12. The UE of claim 1, wherein, in response to DM-RS not being part of a guard interval, a cyclic prefix is inserted in each DM-RS block to fulfill a cyclic convolutional property.

13. The UE of claim 1, wherein the at least one processor is configured to cause the UE to trigger a modification in DM-RS parameters, including a DM-RS duration, a DM-RS type, a DM-RS power, or some combination thereof.

14. A method of performed by a user equipment (UE) apparatus, comprising:

receiving a demodulation reference signal (DM-RS) configuration from a network, the DM-RS configuration comprising a time domain occasion of a DM-RS sequence within a block of fast Fourier transform (FFT) length of a single carrier waveform, a time domain pattern of the DM-RS sequence, and a sequence length of the DM-RS sequence;

receiving the DM-RS sequence within the block of FFT length of the single carrier waveform according to the received DM-RS configuration, wherein the DM-RS sequence is a time-domain sequence mapped to time-domain symbols within the block;

receiving a data sequence within a block of FFT length of the single carrier waveform that is quasi-collocated with an associated DM-RS resource; and demodulating the received data sequence using the DM-RS sequence.

15. A network equipment (NE), comprising:

at least one memory; and at least one processor coupled with the at least one memory and configured to cause the NE to:

transmit a demodulation reference signal (DM-RS) configuration to a user equipment (UE), the DM-RS configuration comprising a time domain occasion of a DM-RS sequence within a block of fast Fourier transform (FFT) length of a single carrier waveform, a time domain pattern of the DM-RS sequence, and a sequence length of the DM-RS sequence;

determine a DM-RS sequence for demodulating a data sequence that is quasi-collocated with an associated DM-RS resource, wherein the DM-RS sequence is a time-domain sequence mapped to time-domain symbols within a block of FFT length;

transmit the DM-RS sequence within the block of FFT length of the single carrier waveform according to the DM-RS configuration; and transmit the data sequence within a block of FFT length of the single carrier waveform that is quasi-collocated with an associated DM-RS resource.

16. A method performed by a network equipment (NE), comprising:

transmitting a demodulation reference signal (DM-RS) configuration to a user equipment (UE), the DM-RS configuration comprising a time domain occasion of a DM-RS sequence within a block of fast Fourier transform (FFT) length of a single carrier waveform, a time domain pattern of the DM-RS sequence, and a sequence length of the DM-RS sequence;

determining a DM-RS sequence for demodulating a data sequence that is quasi-collocated with an associated DM-RS resource, wherein the DM-RS sequence is a time-domain sequence mapped to time-domain symbols within a block of FFT length;

transmitting the DM-RS sequence within the block of FFT length of the single carrier waveform according to the DM-RS configuration; and transmitting the data sequence within a block of FFT length of the single carrier waveform that is quasi-collocated with an associated DM-RS resource.

17. The method of claim 14, wherein DM-RS blocks of guard interval length are inserted periodically in the time domain occasion of a block of fast Fourier transform (FFT) length data.

18. The method of claim 17, wherein a combination of the DM-RS used as a guard interval inside an N-FFT block and DM-RS employed as a whole block length with a random guard interval are configured simultaneously.

19. The method of claim 14, wherein lengths of one or more additional DM-RS blocks are cyclically extended within an N-fast Fourier transform (FFT) block.

20. The method of claim 19, wherein a length of the one or more additional DM-RS blocks is the same as a length of a first DM-RS block.

* * * * *